United States Patent
Wang et al.

(10) Patent No.: US 11,137,375 B2
(45) Date of Patent: Oct. 5, 2021

(54) SYSTEMS AND METHODS OF GRUENEISEN-RELAXATION PHOTOACOUSTIC MICROSCOPY AND PHOTOACOUSTIC WAVEFRONT SHAPING

(71) Applicant: California Institute of Technology, Pasadena, CA (US)

(72) Inventors: Lihong V. Wang, Creve Coeur, MO (US); Lidai Wang, St. Louis, MO (US); Chi Zhang, St. Louis, MO (US); Puxiang Lai, St. Louis, MO (US); Jian Wei Tay, St. Louis, MO (US)

(73) Assignee: California Institute of Technology, Pasadena, CA (US)

( * ) Notice: Subject to any disclaimer, the term of this patent is extended or adjusted under 35 U.S.C. 154(b) by 774 days.

(21) Appl. No.: 15/037,468

(22) PCT Filed: Nov. 19, 2014

(86) PCT No.: PCT/US2014/066437
§ 371 (c)(1),
(2) Date: May 18, 2016

(87) PCT Pub. No.: WO2015/077355
PCT Pub. Date: May 28, 2015

(65) Prior Publication Data
US 2016/0305914 A1    Oct. 20, 2016

Related U.S. Application Data

(60) Provisional application No. 61/906,238, filed on Nov. 19, 2013.

(51) Int. Cl.
*G01N 33/48* (2006.01)
*G01N 33/50* (2006.01)
(Continued)

(52) U.S. Cl.
CPC ....... *G01N 29/2418* (2013.01); *G02B 21/002* (2013.01); *G02B 21/0004* (2013.01);
(Continued)

(58) Field of Classification Search
CPC ..... G01N 29/2418; G01N 2201/06113; G02B 21/0028; G02B 21/008
See application file for complete search history.

(56) References Cited

U.S. PATENT DOCUMENTS 4,029,756 A    6/1977  Gaafar
4,127,318 A    11/1978 Determann et al.
(Continued)

FOREIGN PATENT DOCUMENTS

CN    1883379 A    12/2006
EP    0012262 A1    6/1980
(Continued)

OTHER PUBLICATIONS

English Machine Translation of JP 2010-40161 A. (Year: 2019).*
(Continued)

*Primary Examiner* — Russell S Negin
(74) *Attorney, Agent, or Firm* — Sheila Martinez-Lemke; Weaver Austin Villeneuve & Sampson LLP

(57) ABSTRACT

Systems and methods for focusing a light pulse within a focus area using nonlinear photoacoustic wavefront shaping (PAWS) are disclosed herein. The method includes modulating a spatial phase pattern of a light pulse's waveform based on a Grueneisen-relaxation photoacoustic (GR-PA) feedback signal. In addition, systems and methods for performing Grueneisen-relaxation photoacoustic microscopy (GR-PAM) are disclosed herein that include analyzing photoacoustic signals resulting from illumination of a focus region by two closely spaced light pulses. A method of obtaining an absorption coefficient of a sample using Gru-
(Continued)

eneisen-relaxation photoacoustic microscopy (GR-PAM) is also disclosed.

15 Claims, 12 Drawing Sheets

(51) Int. Cl.
  *G01N 29/24* (2006.01)
  *G02B 21/00* (2006.01)
(52) U.S. Cl.
  CPC ....... *G02B 21/008* (2013.01); *G02B 21/0028* (2013.01); *G01N 2201/06113* (2013.01)

(56) References Cited

U.S. PATENT DOCUMENTS

| | | |
|---|---|---|
| 4,255,971 A | 3/1981 | Rosencwaig |
| 4,267,732 A | 5/1981 | Quate |
| 4,284,324 A | 8/1981 | Huignard et al. |
| 4,375,818 A | 3/1983 | Suwaki et al. |
| 4,385,634 A | 5/1983 | Bowen |
| 4,430,897 A | 2/1984 | Quate |
| 4,430,987 A | 2/1984 | Heller |
| 4,462,255 A | 7/1984 | Guess et al. |
| 4,468,136 A | 8/1984 | Murphy et al. |
| 4,489,727 A | 12/1984 | Matsuo et al. |
| 4,546,771 A | 10/1985 | Eggleton et al. |
| 4,596,254 A | 6/1986 | Adrian et al. |
| 4,687,304 A | 8/1987 | Piller et al. |
| 4,740,081 A | 4/1988 | Martens et al. |
| 4,802,461 A | 2/1989 | Cho |
| 4,802,487 A | 2/1989 | Martin et al. |
| 4,809,703 A | 3/1989 | Ishikawa et al. |
| 4,850,363 A | 7/1989 | Yanagawa |
| 4,860,758 A | 8/1989 | Yanagawa et al. |
| 4,869,256 A | 9/1989 | Kanno et al. |
| 4,872,758 A | 10/1989 | Miyazaki et al. |
| 4,921,333 A | 5/1990 | Brody et al. |
| 4,929,951 A | 5/1990 | Small |
| 4,995,396 A | 2/1991 | Inaba et al. |
| 5,070,455 A | 12/1991 | Singer et al. |
| 5,083,549 A | 1/1992 | Cho et al. |
| 5,107,844 A | 4/1992 | Kami et al. |
| 5,115,814 A | 5/1992 | Griffith et al. |
| 5,125,410 A | 6/1992 | Misono et al. |
| 5,140,463 A | 8/1992 | Yoo et al. |
| 5,170,793 A | 12/1992 | Takano et al. |
| 5,194,723 A | 3/1993 | Cates et al. |
| 5,207,672 A | 5/1993 | Roth et al. |
| 5,227,912 A | 7/1993 | Ho et al. |
| 5,305,759 A | 4/1994 | Kaneko et al. |
| 5,321,501 A | 6/1994 | Swanson et al. |
| 5,329,817 A | 7/1994 | Garlick et al. |
| 5,331,466 A | 7/1994 | Van Saarloos |
| 5,345,938 A | 9/1994 | Nishiki et al. |
| 5,373,845 A | 12/1994 | Gardineer et al. |
| 5,414,623 A | 5/1995 | Lu et al. |
| 5,445,155 A | 8/1995 | Sieben |
| 5,465,722 A | 11/1995 | Fort et al. |
| 5,546,187 A | 8/1996 | Pepper et al. |
| 5,546,947 A | 8/1996 | Yagami et al. |
| 5,546,948 A | 8/1996 | Hamm et al. |
| 5,606,975 A | 3/1997 | Liang et al. |
| 5,615,675 A | 4/1997 | O'Donnell et al. |
| 5,635,784 A | 6/1997 | Seale |
| 5,651,366 A | 7/1997 | Liang et al. |
| 5,713,356 A | 2/1998 | Kruger |
| 5,718,231 A | 2/1998 | Dewhurst et al. |
| 5,781,294 A | 7/1998 | Nakato et al. |
| 5,836,872 A | 11/1998 | Kenet et al. |
| 5,840,023 A | 11/1998 | Oraevsky et al. |
| 5,860,934 A | 1/1999 | Sarvazyan |
| 5,913,234 A | 6/1999 | Julliard et al. |
| 5,971,998 A | 10/1999 | Russell et al. |
| 5,977,538 A | 11/1999 | Unger et al. |
| 5,991,697 A | 11/1999 | Nelson et al. |
| 6,055,097 A | 4/2000 | Lanni et al. |
| 6,102,857 A | 8/2000 | Kruger |
| 6,104,942 A | 8/2000 | Kruger |
| 6,108,576 A | 8/2000 | Alfano et al. |
| 6,111,645 A | 8/2000 | Tearney et al. |
| 6,134,003 A | 10/2000 | Tearney et al. |
| 6,216,025 B1 | 4/2001 | Kruger |
| 6,233,055 B1 | 5/2001 | Mandella et al. |
| 6,282,011 B1 | 8/2001 | Tearney et al. |
| 6,292,682 B1 | 9/2001 | Kruger |
| 6,309,352 B1 | 10/2001 | Oraevsky et al. |
| 6,341,036 B1 | 1/2002 | Teamey et al. |
| 6,379,325 B1 | 4/2002 | William et al. |
| 6,405,069 B1 | 6/2002 | Oraevsky et al. |
| 6,413,228 B1 | 7/2002 | Hung et al. |
| 6,421,164 B2 | 7/2002 | Tearney et al. |
| 6,432,067 B1 | 8/2002 | Martin et al. |
| 6,466,806 B1 | 10/2002 | Geva et al. |
| 6,485,413 B1 | 11/2002 | Boppart et al. |
| 6,490,470 B1 | 12/2002 | Kruger |
| 6,498,942 B1 | 12/2002 | Esenaliev et al. |
| 6,498,945 B1 | 12/2002 | Alfheim et al. |
| 6,501,551 B1 | 12/2002 | Tearney et al. |
| 6,545,264 B1 | 4/2003 | Stern |
| 6,564,087 B1 | 5/2003 | Pitris et al. |
| 6,567,688 B1 | 5/2003 | Wang |
| 6,590,830 B1 | 7/2003 | Garlick et al. |
| 6,626,834 B2 | 9/2003 | Dunnie et al. |
| 6,628,404 B1 | 9/2003 | Kelley et al. |
| 6,633,774 B2 | 10/2003 | Kruger |
| 6,654,630 B2 | 11/2003 | Zuluaga et al. |
| 6,658,279 B2 | 12/2003 | Swanson et al. |
| 6,694,173 B1 | 2/2004 | Bende et al. |
| 6,701,181 B2 | 3/2004 | Tang et al. |
| 6,751,490 B2 | 6/2004 | Esenaliev et al. |
| 6,764,450 B2 | 7/2004 | Yock |
| 6,831,781 B2 | 12/2004 | Tearney et al. |
| 6,833,540 B2 | 12/2004 | MacKenzie et al. |
| 6,839,496 B1 | 1/2005 | Mills et al. |
| 6,846,288 B2 | 1/2005 | Nagar et al. |
| 6,853,446 B1 | 2/2005 | Almogy et al. |
| 6,877,894 B2 | 4/2005 | Vona et al. |
| 6,937,886 B2 | 8/2005 | Zavislan |
| 6,956,650 B2 | 10/2005 | Boas et al. |
| 7,072,045 B2 | 7/2006 | Chen et al. |
| 7,198,778 B2 | 4/2007 | Achilefu et al. |
| 7,231,243 B2 | 6/2007 | Tearney et al. |
| 7,245,789 B2 | 7/2007 | Bates et al. |
| 7,266,407 B2 | 9/2007 | Li et al. |
| 7,322,972 B2 | 1/2008 | Viator et al. |
| 7,357,029 B2 | 4/2008 | Falk |
| 7,382,949 B2 | 6/2008 | Bouma et al. |
| 7,541,602 B2 | 6/2009 | Metzger et al. |
| 7,610,080 B1 | 10/2009 | Winchester, Jr. et al. |
| 7,917,312 B2 | 3/2011 | Wang et al. |
| 8,016,419 B2 | 9/2011 | Zhang et al. |
| 8,025,406 B2 | 9/2011 | Zhang et al. |
| 8,143,605 B2 | 3/2012 | Metzger et al. |
| 8,397,573 B2 | 3/2013 | Kobayashi |
| 8,416,421 B2 | 4/2013 | Wang et al. |
| 8,454,512 B2 | 6/2013 | Wang et al. |
| 8,891,088 B2 | 11/2014 | Goldshmidt et al. |
| 8,997,572 B2 | 4/2015 | Wang et al. |
| 9,220,415 B2 | 12/2015 | Mandelis et al. |
| 9,234,841 B2 | 1/2016 | Wang et al. |
| 9,335,605 B2 | 5/2016 | Wang et al. |
| 9,528,966 B2 | 12/2016 | Wang et al. |
| 9,618,445 B2 | 4/2017 | Sun et al. |
| 10,359,400 B2 | 7/2019 | Wang et al. |
| 10,433,733 B2 | 10/2019 | Wang et al. |
| 10,448,850 B2 | 10/2019 | Wang et al. |
| 11,020,006 B2 | 6/2021 | Wang et al. |
| 11,029,287 B2 | 6/2021 | Wang et al. |
| 2001/0052979 A1 | 12/2001 | Treado et al. |
| 2002/0093637 A1 | 7/2002 | Yuan et al. |
| 2002/0173780 A1 | 11/2002 | Altshuler et al. |
| 2002/0176092 A1 | 11/2002 | Deck |

(56) References Cited

U.S. PATENT DOCUMENTS

| | | |
|---|---|---|
| 2003/0097066 A1 | 5/2003 | Shelby et al. |
| 2003/0160957 A1 | 8/2003 | Oldham et al. |
| 2003/0160967 A1 | 8/2003 | Houston et al. |
| 2004/0030255 A1 | 2/2004 | Alfano et al. |
| 2004/0039379 A1 | 2/2004 | Viator et al. |
| 2004/0082070 A1 | 4/2004 | Jones et al. |
| 2004/0254474 A1 | 12/2004 | Seibel et al. |
| 2005/0015002 A1 | 1/2005 | Dixon et al. |
| 2005/0028482 A1 | 2/2005 | Cable et al. |
| 2005/0143664 A1 | 6/2005 | Chen et al. |
| 2005/0154313 A1 | 7/2005 | Desilets et al. |
| 2005/0168749 A1 | 8/2005 | Ye et al. |
| 2005/0217381 A1 | 10/2005 | Falk |
| 2005/0234315 A1 | 10/2005 | Mayevsky et al. |
| 2005/0277824 A1 | 12/2005 | Aubry et al. |
| 2006/0055936 A1 | 3/2006 | Yun et al. |
| 2006/0058614 A1 | 3/2006 | Tsujita |
| 2006/0122516 A1 | 6/2006 | Schmidt et al. |
| 2006/0181791 A1 | 8/2006 | Van Beek et al. |
| 2006/0184042 A1 | 8/2006 | Wang et al. |
| 2006/0235299 A1 | 10/2006 | Martinelli |
| 2006/0247510 A1 | 11/2006 | Wiemker et al. |
| 2006/0264717 A1 | 11/2006 | Pesach et al. |
| 2007/0088206 A1 | 4/2007 | Peyman et al. |
| 2007/0093702 A1 | 4/2007 | Yu et al. |
| 2007/0213590 A1 | 9/2007 | Squicciarini |
| 2007/0213618 A1 | 9/2007 | Li et al. |
| 2007/0213693 A1 | 9/2007 | Plunkett |
| 2007/0282200 A1 | 12/2007 | Johnson et al. |
| 2007/0299341 A1 | 12/2007 | Wang et al. |
| 2008/0029711 A1 | 2/2008 | Viellerobe et al. |
| 2008/0037367 A1 | 2/2008 | Gross et al. |
| 2008/0088838 A1 | 4/2008 | Raicu et al. |
| 2008/0123083 A1 | 5/2008 | Wang et al. |
| 2008/0173093 A1 | 7/2008 | Wang et al. |
| 2008/0230717 A1 | 9/2008 | Ashkenazi et al. |
| 2009/0051900 A1 | 2/2009 | Moon et al. |
| 2009/0054763 A1 | 2/2009 | Wang et al. |
| 2009/0088631 A1 | 4/2009 | Dietz et al. |
| 2009/0116518 A1 | 5/2009 | Patel et al. |
| 2009/0138215 A1 | 5/2009 | Wang et al. |
| 2009/0185191 A1 | 7/2009 | Boppart et al. |
| 2009/0227997 A1 | 9/2009 | Wang et al. |
| 2010/0079768 A1 | 4/2010 | Wang et al. |
| 2010/0134793 A1* | 6/2010 | Krishnamachari .... G01N 21/63 356/301 |
| 2010/0245766 A1 | 9/2010 | Zhang et al. |
| 2010/0245769 A1 | 9/2010 | Zhang et al. |
| 2010/0245770 A1 | 9/2010 | Zhang et al. |
| 2010/0249562 A1 | 9/2010 | Zhang et al. |
| 2010/0268042 A1 | 10/2010 | Wang et al. |
| 2010/0285518 A1 | 11/2010 | Viator et al. |
| 2010/0309466 A1 | 12/2010 | Lucassen et al. |
| 2010/0322497 A1 | 12/2010 | Dempsey et al. |
| 2011/0071402 A1 | 3/2011 | Masumura |
| 2011/0122416 A1 | 5/2011 | Yang et al. |
| 2011/0201914 A1 | 8/2011 | Wang et al. |
| 2011/0251515 A1 | 10/2011 | Leuthardt et al. |
| 2011/0275890 A1 | 11/2011 | Wang et al. |
| 2011/0282181 A1 | 11/2011 | Wang et al. |
| 2011/0282192 A1 | 11/2011 | Axelrod et al. |
| 2012/0070817 A1 | 3/2012 | Wang et al. |
| 2012/0074294 A1* | 3/2012 | Streuber .................. G01J 9/00 250/201.9 |
| 2012/0118052 A1 | 5/2012 | O'Donnell et al. |
| 2012/0204648 A1* | 8/2012 | Wang ................... A61B 5/0095 73/606 |
| 2012/0275262 A1 | 11/2012 | Song et al. |
| 2012/0307250 A1 | 12/2012 | Wang |
| 2013/0199299 A1 | 8/2013 | Wang et al. |
| 2013/0218002 A1 | 8/2013 | Kiraly |
| 2013/0245406 A1 | 9/2013 | Wang et al. |
| 2014/0009808 A1 | 1/2014 | Wang et al. |
| 2014/0029829 A1 | 1/2014 | Jiang et al. |
| 2014/0142404 A1 | 5/2014 | Wang et al. |
| 2014/0356897 A1 | 12/2014 | Wang et al. |
| 2015/0005613 A1 | 1/2015 | Kim et al. |
| 2015/0178959 A1 | 6/2015 | Huang et al. |
| 2015/0185187 A1 | 7/2015 | Wang et al. |
| 2015/0245771 A1 | 9/2015 | Wang et al. |
| 2015/0272444 A1 | 10/2015 | Maslov et al. |
| 2015/0272446 A1 | 10/2015 | Wang et al. |
| 2015/0316510 A1 | 11/2015 | Fukushima et al. |
| 2016/0081558 A1 | 3/2016 | Wang et al. |
| 2016/0235305 A1 | 8/2016 | Wang et al. |
| 2016/0242651 A1 | 8/2016 | Wang et al. |
| 2016/0249812 A1 | 9/2016 | Wang et al. |
| 2016/0262628 A1 | 9/2016 | Wang et al. |
| 2016/0305914 A1 | 10/2016 | Wang et al. |
| 2016/0310083 A1 | 10/2016 | Wang et al. |
| 2016/0345886 A1 | 12/2016 | Wang et al. |
| 2017/0065182 A1 | 3/2017 | Wang et al. |
| 2017/0105636 A1 | 4/2017 | Wang et al. |
| 2017/0367586 A9 | 12/2017 | Wang et al. |
| 2018/0020920 A1 | 1/2018 | Ermilov et al. |
| 2018/0132728 A1 | 5/2018 | Wang et al. |
| 2018/0177407 A1 | 6/2018 | Hashimoto et al. |
| 2019/0008444 A1 | 1/2019 | Wang et al. |
| 2019/0125583 A1 | 5/2019 | Wang et al. |
| 2019/0022703 A1 | 7/2019 | Wang et al. |
| 2019/0307334 A1 | 10/2019 | Wang et al. |
| 2020/0056986 A1 | 2/2020 | Wang et al. |
| 2020/0073103 A1 | 3/2020 | Wang et al. |
| 2020/0268253 A1 | 8/2020 | Wang et al. |
| 2020/0275846 A1 | 9/2020 | Wang et al. |
| 2020/0397523 A1 | 12/2020 | Gao et al. |
| 2021/0010976 A1 | 1/2021 | Wang et al. |
| 2021/0132005 A1 | 5/2021 | Wang et al. |

FOREIGN PATENT DOCUMENTS

| | | | |
|---|---|---|---|
| EP | 0919180 A1 | 6/1999 | |
| EP | 1493380 A1 | 1/2005 | |
| JP | 05-125725 A | 5/1993 | |
| JP | 2000/292416 A | 10/2000 | |
| JP | 2009/068977 A | 4/2009 | |
| JP | 2010/017426 A | 1/2010 | |
| JP | 2010-40161 A * | 12/2010 | |
| JP | 2012/143384 A | 8/2012 | |
| JP | 2014124242 A | 7/2014 | |
| JP | 2014/224806 A | 12/2014 | |
| JP | 2016-101260 A | 6/2016 | |
| JP | 6086718 B2 | 3/2017 | |
| KR | 100946550 B1 | 3/2010 | |
| KR | 20160091059 A | 8/2016 | |
| KR | 2017-0006470 A | 1/2017 | |
| WO | WO2006/111929 A1 | 10/2006 | |
| WO | WO2007/088709 A1 | 8/2007 | |
| WO | WO2007/148239 A2 | 12/2007 | |
| WO | WO2008/062354 A1 | 5/2008 | |
| WO | WO2008/100386 A2 | 8/2008 | |
| WO | WO2009/055705 A2 | 4/2009 | |
| WO | WO2010/048258 A1 | 4/2010 | |
| WO | WO2010/080991 A2 | 7/2010 | |
| WO | WO-2011060101 A2 * | 5/2011 | ......... G02B 21/0056 |
| WO | WO2011/091360 A2 | 7/2011 | |
| WO | WO2011/127428 A2 | 10/2011 | |
| WO | WO2012/035472 A1 | 3/2012 | |
| WO | WO2013/086293 A1 | 6/2013 | |
| WO | WO2015/118881 A1 | 8/2015 | |
| WO | WO2018/102446 A2 | 6/2018 | |
| WO | WO2018/20946 | 11/2018 | |

OTHER PUBLICATIONS

International Search Report of International Application No. PCT/US2014/066437, dated Feb. 26, 2015, 3 pages.
Final Office Action dated May 24, 2019 issued in U.S. Appl. No. 14/436,581.
Office Action dated Apr. 3, 2020 issued in U.S. Appl. No. 14/436,581.
International Search Report and Written Opinion dated Mar. 27, 2014 issued in Application No. PCT/US2013/065594.

(56) References Cited

OTHER PUBLICATIONS

PCT, Notification of Transmittal of The International Search Report and The Written Opinion of the International Searching Authority, or the Declaration, for PCT/US2009/061435, dated Mar. 29, 2010, 6 pages.
Notification 01 Transmittal of the International Search Report and The Written Opinion of the International Searching Authority, dated Sep. 22, 2011, from related application No. PCT/US2011/022253, 8 pgs.
Partial European Search Report issued for European Application No. 17159220.7, dated Aug. 23, 2017 (10 pages).
International Search Report and Written Opinion dated Apr. 22, 2009, from Application No. PCT/US2008/081167 (7 pages).
International Search Report and Written Opinion from Application Serial No. PCT/US2010/020488, dated Aug. 31, 2010 (10 pages).
International Search Report and Written Opinion from Application Serial No. PCT/US2011/031823, dated Dec. 26, 2011 (8 pages).
International Search Report and Written Opinion from Application Serial No. PCT1US2012/068403, dated Mar. 19, 2013 (10 pages).
Extended European Search Report from European Application Serial No. 08842292.8, dated Dec. 17, 2013 (8 pages).
Final Office Action from related Japanese Patent Application No. JP 2010-531281, dated Mar. 11, 2014, (5 pages).
International Search Report and Written Opinion dated Dec. 2, 2019, issued in Application No. PCT/US2019/046574.
International Search Report and Written Opinion dated Dec. 23, 2019, issued in Application No. PCT/US2019/049594.
Al, et al., "Spectral-domain optical coherence tomography: Removal of autocorrelation using an optical switch," Applied Physics Letters, (Mar. 15, 2006), 88(11): pp. 111115-1-111115-3. <doi:10.1063/1.2186520>.
Allen, et al., "Pulsed Near-Infrared Laser Diode Excitation System for Biomedical Photoacoustic Imaging,", Optics Letters, Optical Society of America, USA., vol. 31, No. 23, Dec. 1, 2006, pp. 3462-3464.
Aubry J.-F., et al., "Experimental demonstration of noninvasive transskull adaptive focusing based on prior computed tomography scans", J. Acoust. Soc. Am. 113(1), 84-93 (2003). (Year: 2003).
Baker, M. J. et al., "Using Fourier transform IR spectroscopy to analyze biological materials,"Nat. Protoc. 9, 1771-1791 (2014).
Beaven, G. H. & Holiday, E. R., "Ultraviolet absorption spectra of proteins and amino acids," Adv. Protein Chem 7, 319-386 (1952).
Bell, A.G., "On the Production and Reproduction of Sound by Light," Americal Journal of Sciences, Oct. 1880, pp. 305-324, Third Series, vol. XX, USA.
Bioucas-Diaz, J.M. and Figueiredo, M.A.T. "A new TwIST: two-step iterative shrinkage/thresholding algorithms for image restorating," IEEE Trans. Image Process. 16, 2992-3004 (Dec. 2007).
Calasso et al., "Photoacoustic Point Source", Physical Review Letters, vol. 86, No. 16, Apr. 16, 2001, pp. 3550-3553.
Cannata et al., "Development of a 35-MHz Piezo-Composite Ultrasound Array for Medical Imaging," IEE Transactions on Ultrasonics, Ferroelectrics, and Frequency Control, 53(1): pp. 224-236 (2006).
Chan, et al., "New Opportunites in micro- and macro-attenuated total reflection infrared spectroscopic imaginng: spatial resolution and sampling versatility," Appl. Spectrosc. 57, 381-389 (2003).
Cheng, J.-X. et al., "Vibrational and spectroscopic imaginng of living systems: an emerging platform for biology and medicine," Science, vol. 350 aaa8870, No. 6264, Nov. 27, 2015, pp. 1054-1063.
Cheong, et al., "A review of the optical properties of biological tissues," IEEE J. Quantam Electronics, 26(12): pp. 2166-2185 (1980).
Cox, B., Beard, P., "Photoacoustic tomography with a single detector in a reverberant cavity" J. Acoust. Soc. Am. 125, 1426 (Mar. 2009).
De Boer, et al., "Improved signal-to-noise ratio in spectral-domain compared with time-domain optical coherence tomography", Optics Letters, vol. 28, No. 21, Nov. 1, 2003, pp. 2067-2069.

D'Andrea, et al., "Time-resolved optical imaging through turbid media using a fast data acquisition system based on a gated CCD camera" Journal of Physics D: Applied Physics, vol. 36, No. 14, Jul. 1, 2003, pp. 1675-1681.
Danielli, et al., "Label-free photoacoustic nanoscopy," Jorunal of Biomedical Optics, vol. 19, No. 8, Aug. 2014, pp. 086006-1-086006-10.
Dazzi, A. et al., "AFM-IR: technology and applications in nanoscale infrared spectroscopy and chemical imaging," Chem. Rev. 117, 5146-5173 (2017).
Dazzi, A., et al., "Local infrared microspectroscopy with subwavelength spatial resolution with an atomic force microscope tip used as a photothermal sensor," Optics Letters, vol. 30, No. 18, Sep. 15, 2005, pp. 2388-2390.
Diebold, et al., "Photoacoustic Monopole Radiation in One, Two and Three Dimensions," Physical Review Letters, Figs. 1 and 2, vol. 67, No. 24, Dec. 9, 1991, pp. 3384-3387.
"Diebold, et al., ""Photoacoustic Signature of Particulate Matter: Optical Production of Acoustic Monopole Radition,"" Science New Series, Oct. 5, 1990, pp. 101-104, vol. 250, No. 4977, pp. 101-104."
Diem, M. et al., "Molecular pathology via IR and Raman spectral imaging." Journal of Biophotonics, vol. 6, No. 11-12 (2013) pp. 855-886. <doi:10.1002/jbio.201300131>.
Diem, M. et al., "A decade of vibration micro-spectroscopy of human cells and tissue (1994-2004)†, "Analyst, Oct. 2004, vol. 129, No. 10, pp. 880-885. <doi:10.1039/b408952a>.
Draeger, C., Fink, M., "One-channel time reversal of elastic waves in a chaotic 2D-silicon cavity," Phys. Rev. Lett. 79, 407-410 (Jul. 21, 1997).
Dunn, et al., "Transport-based image reconstruction in turbid media with small source-detector separations," Optics Letters, vol. 25, No. 24, Dec. 15, 2000, pp. 1777-1779.
Ermilov et al., "Laser optoacoustic imaging system for detection of breast cancer," Journal of Biomedical Optics, vol. 14, No. 2, pp. 24007-024007-14 (2009).
Erpelding, et al., "Sentinel Lymph Nodes in the Rat: Noninvasive Photoacoustic and US Imaging with a Clinical US System," Radiology, 256(1): 102-110 (2010).
Evans, et al., "Coherent Anti-Stokes Raman Scattering Microscopy: Chemical Imaging for Biology and Medicine," Annual Review of Analytical Chemistry 1, 2008, pp. 883-909.
Fan, et al., "Development of a Laser Photothermacoustic Frequency-Swept System for Subsurface Imaging: Theory and Experiment," J. Acoust. Soc. Am., vol. 116(6), Dec. 2004, pp. 3523-3533.
Fang, et al., "Photoacoustic Doppler effect from flowing small light-absorbing particles," Physical Review Letters 99(18) 184501-(1-4) (Nov. 2, 2007).
Fercher, et al., "Measurement of Intraocular Distrances by Backscattering Spectral Interferometry," Optics Communications, 1995, vol. 117, pp. 43-48.
Fernandez, D. C., Bhargava, R., Hewitt, S. M. & Levin, I. W., "Infrared spectroscopic imaging for histopathologic recognition," Nat. Biotechnol. 23, 469-474 (2005).
Foster, et al., "Advances in ultrasound biomicroscopy" Ultrasound in Medicine & Biology, vol. 26, No. 1, Jan. 2000, pp. 1-27.
Fujita, K., et al., "Confocal multipoint multiphoton excitation microscope with microlens and pinhole arrays," Opt. Comm. 174, 7-12 (Jan. 15, 2000).
Fursterberg, et al., "Chemical Imaging using Infrared Photo-thermal Microspectroscopy," In Proceedings of SPIE Defense, Securiity, and Sensing (eds Druy, M.A. & Crocommbe, R. A.) 837411 (SPIE, 2012).
Gao, L.; Liang J.]; Li, C.; Wang, L. V.; "Single-shot compressed ultrafast photography at one hundred billion frames per second," Nature 516(7529) 74-77 (Dec. 4, 2014).
Gibson, et al., "Recent advances in diffuse optical imaging" Physics in Medicine and Biology 50, 2005, pp. R1-R43, Inslilule of Physics Publishing, UK.
Gong, L. et al., "Breaking the diffraction limit by saturation in stimulated-Raman-scattering microscopy: a theoretical study," Phys. Rev. A 90, 13818 (2014).
Griffiths, P., "Fourier transform infrared spectometry," Science 21, 297-302 (1983).

(56) References Cited

OTHER PUBLICATIONS

Guggenheim, et al., "Ultrasensitive planoconcave optical microresonators for ultrasound sensing" Nat. Photon. 11, 714-721 (2017).
Guittet C, et al., "In vivo high-frequency ultrasonic characterization of human dermis," IEEE Transactions on Bio-medical Engineering. Jun. 1999;46(6):740-746 <doi:10.1109/10.764950>.
Haas, J. et al., "Advances in Mid-Inrared Spectroscopy for Chemical Analysis," Annu. Rev. Anal. Chem. 9 (2016) pp. 45-68.
Hai, J. Yao, K.I. Maslow, Y. Zhou, and L.V. Wang, "Near-inrared optical-resolution photoacoustic microscopy" Opt. Lett. 39, 5192-5195 (Sep. 1, 2014).
Hai, P.; Imai, T.]; Xu, S.; Zhang, R.; Aft, R.L.; Zou, J.; Wang, L.V.; "High-throughput label, label-free, single-cell photoacoustic microscopy of intratumoral metabolic heteogeneity," Nature Biomedical Engineering 3(5) 381-391 (May 2019).
Hebden et al., "Enhanced time-resolved imaging with a diffusion model of photon transport" Optics Letters, vol. 19, No. 5, 1994, pp. 311-313.
Hee, et al., "Femtosecond transillumination tomography in thick tissues" Optics Letters, vol. 18, No. 13, 1993, pp. 1107-1109.
Hillman, et al., "Laminar optical tomography: demonstration of millimeter-scale depth-resolved imaging in turbid media" Optics Letters, vol. 29, No. 14, Jul. 15, 2004, pp. 1650-1652.
Hu, S. et al., "Three-dimensional optical-resolution photoacoustic microscopy," Journal of Visualized Experiments 51 (2011).
Hu, S. et al., "Label-free Photoacousitcs Ophthalmic Angiography" Optics Letters, 35(1), Jan. 1, 2010, pp. 1-3.
Huang, et al., "Abberation correction for transcranial photoacoustic tomography of primates employing adjunct image data," Journal of Biomedical Optics, vol. 17, No. 6, Jun. 2012, pp. 066016-1 to 066016-8.
Huang, et al., "Optical Coherennce Tomography," Science, New Series, vol. 254, No. 5035, Nov. 22, 1991, pp. 1178-1181.
Huber, et al., "Three-Dimensional and C-Mode 6 OCT Imaging with a Compact, Frequency Swept Laser Source at 1300 nn" Optics Express, vol. 13, No. 26, Dec. 26, 2005, pp. 10523-10526.
Imai, T. et al., "High-throughput ultraviolet photoacoustic microscopy with multifocal excitation," Journal of Biomedical Optics 23(3), 036007 (Mar. 15, 2018).
Ing. R. K., Quiffin, N., Catheline, S., Fink, M., "In solid localization of finger impacts using acousic time-reversal process," Appl. Phys. Lett. 87, 204104 (Nov. 14, 2005).
Ji, M. et al., "Detection of human brain tunor infiltration with quantitative stimulated Raman scatterring microscopy," Sci. Transl. Med 7, 309ra163 (2015).
Karamata, et al., "Multiple scattering in optical coherence tomography. II. Experimental and theoretical investigation of cross talk in wide-field optical coherence tomography" J. Opt. Soc. Am. A/vol. 22, No. 7/Jul. 2005, pp. 1380-1388.
Kim, C. et al., "In vivo molecular photoacoustic tomography of melanomas targeted by bio-conjugated gold nanocages" ACS Nano, 2010; 4(8), pp. 4559-4564. <doi:10.1021/nn100736c>.
Knoll, B., & Keilmann, F., "Near-field probing of vibrational absorption for chemical microscopy," Nature 399, 134-137 (1999).
Kole, M. R., et al., "Discrete frequency infrared microspectroscopy and imaging with a tunable quantum cascade laser,"Anal. Chem. 84, 10366-10372 (2012).
Kolkman, et al., "In Vivo Protoacoustic Imaging of Blood Vessels Using an Extreme-Narrow Apeture Sensor" IEEE Journal of Selected Topics in Quantum Electronics, vol. 9, No. 2, Mar./Apr. 2003, pp. 343-346.
Kruger, et al., "Thermoacoustic Molecular Imaging of Small Animals," Molecular Imaging, 2(2): 113-123 (2003).
Ku and Wang, "Scanning thermoacoustic tomography in biological tissue." Medical Physics 27.5 (2000): 1195-1202.
Ku and Wang, "Scanning microwave-induced thermoacoustic tomography: Signal, resolution, and contrast," Medical Physics 28(1): 4-10 (2001).
Ku, G. et al., "Multiple-bandwidth photoacoustic tomography," Physics in Medicine & Biology, 49(7): 1329-1338 (2004).
Ku and Wang, "Deeply penetrating photoacoustic tomography in biological tissues enhanced with an optical contrast agent," Optics Letters, 30(5): 507-509 (2005).
Ku, et al., "Imaging of tumor angiogensis in rat brains in vivo by photoacoustic tomography," Applied Optics, 770-775 (2005).
Ku, et al., "Thermoacoustic and Photoacoustic Tomography of Thick Biological Tissues Toward Breast Imaging," Technology in Cancer Research & Treatment, 4(5): 559-566 (2005).
Kunitz, M., "Crystalline desoxyribonuclease; isolation and general properties; spectrophometric method for the measurement of desoxyribonuclease activity" The Journal General Physiology, vol. 33, Mar. 20, 1950, pp. 349-362. <URL:http://doi.org./10/1085/jgp. 33.4.349>.
Lai, P. et al., "Photoacoustically guided wavefrontt shaping for enhanced optical focusing in scattering media," Nature Photonics 9 126-132 (Jan. 19, 2015).
Larina, et al., Real-time optoacoustic monitoring of tempature in tissues: Journal of Physics D: Applied Physics, vol. 38, (2005) pp. 2633-2639.
Lasch, et al., "FT-IR spectroscopic investigations of single cells on the subceullar level," Vibr. Spectrosc. 147-157 (2002).
Lewis, E. N. et al., "Fourier transform spectroscopic imaging using an infrared focal-Plane array detector," Anal. Chem. 67, 3377-3381 (1995).
Letigeb, et al., "Performance of Fourier domain vs. time domain optical coherernce tomography," Optical Express, vol. 11, No. 8, Apr. 21, 2003, pp. 889-894.
Li, G., et al., "Reflection-mode multifocal optical-resolution photoacoustic microscopy," J. Biomed. Opt. 18, 030501 (Feb. 12, 2013).
Li, L., et al., "Small near-infrared photochromic protein for photoacoustic multi-contrast imaging and detection of protein interactions in vivo," Nature Communications 9(1) 2734 (Jul. 16, 2018).
Li, L.., et al., "Single-impulse panoramic photoacoustic computed tomography of small-animal whole-body dynamics at high spatiotemporal resolution," Nature Biomedical Engineering 1 0071 (May 10, 2017).
Li, L.., et al., "Simultaneous Molecular and Hypoxia Imaging of Brain Tumors in Vivo Using Spectroscopic Photoacoustic Tomography," Proceedings of the IEEE, 96(3): 481-489 (2008).
Li, Y. et al., "Multifocal photoacoustic microscopy through an ergodic relay (Conference Presentation)", Proc. SPIE 10878, Photons Plus Ultrasound: Imaging and Sensing 2019, 108781C, presented Feb. 4, 2019, published Mar. 4, 2019, https://doi.org/10.1117/12.2513502.
Li, et al., "Optical Coherence Computed Tomography," Applied Physics Letters, vol. 91, American Institute of Physics, 2007, pp. 141107-1-141107-3.
Li, Y., et al., "Snapshot photoacoustic topgraphy through an ergodic relay for high-throughout imaging of optical absoprtioon," Nature Photonics, Jan. 20, 2020. <URL:https://doi.org/10.1038/s41566-019-0576-2>.
Li, Z., et al., "Super-resolution far-field infrared imaging by photothermal heterodyne imaging," The Journal of Physical Chemistry B, vol. 121 (2017) pp. 8838-8846.
Li, Z., et al., "Super-resolution imaging with mid-IR photothermal microscopy on the single particle level," In Proceedings of SPIE Physical Chemistry of Interfaces and Nano-materials XIV, vol. 9549, Aug. 20, 2015, pp. 954912-1-954912-8.
Liang, et al., "Single-shot real-time femtosecond imaging of temporal focusing," Light-Science & Applications 7(1) 42 (Aug. 8, 2018).
Liang, et al., "Single-shot real-time video recording of a photonic Mach cone induced by a scattered light pulse," Science Advances 3(1) e1601814 (Jan. 20, 2017).
Liang, et al., "Single-shot ultrafast optical imaging," Optica 5(9) 1113-1127 (Sep. 2018).
Lin, et al., "Single-breath-hold photoacoustic computed tomography of the breast," Nature Communications 9(1) 2352 (Jun. 15, 2018).
Liu, et al., "Optical focusing deep inside dynamic scattering media with near-infrared time-reversed ultrasonically encoded (TRUE) light," Nature Communications 6 5409 (Jan. 5, 2015).

(56) References Cited

OTHER PUBLICATIONS

Lovell, et al., "Porphysome nanovesicles generated by porphyrin bilayers for use as multimodal biophotonic contrast agents," Nature Materials 10(4) 324-32 (Mar. 20, 2011).
Lu, F., et al., "Tip-enhanced infrared nanospectroscopy via molecular expansion force detection," Nat. Photon. 8, 307-312 (2014).
Lu, F.-K. et al., "Label-free DNA imaging in vivo with stimulated Raman scattering microscopy," Proc. Natl Acad Sci. USA 112, 11624-11629 (2015).
Ma, et al., "Time-reversed adapted perturbation (TRAP) optical focusing onto dynamic objects inside scattering media," Nature Photonics 8(12) 931-936 (Nov. 2, 2014).
Manohar, et al., "Initial results of in vivo non-invasive imaging in the human breast using near-infrared photoacoustics," Optics Express, 15(19): 12277-12285 (2007).
Maslov, et al., "In vivo dark-field reflection-mode photoacoustic microscopy," Optics Letters 30(6), Mar. 15, 2005, pp. 625-627.
Maslov, et al., "Optical-resolution photoacoustic microscopy for in vivo imaging of single capillaries," Optical Letters, 33(9): 929-931 (2008).
Maslov, et al., "Photoacoustitc Imaging of biological tissue with Intensity-Modulated Continuous-Wave Laser" Journal of Biomedical Optics, 2008, pp. 024006 1-5, vol. 13(2), SPIE, USA.
Michaelian, Kirk H. Photoacoustic IR spectroscopy: instrumentation, applications and data analysis. Pub. John Wiley & Sons; Dec. 1, 2010. <Preface Only>.
Miller, et al., "Synchrotron-based biological microspectroscopy: From the mid-infrared through the far-infrared regimes," Journal of Biological Physics 29, 219-230 (2003).
Mishra et al., "Development and comparison of the DTM, the DOM and the FVM formulations for the short-pulse later transport through a participating medium" International Journal of Heat and Mass Transfer, vol. 49 (2006) pp. 1820-1832.
Montaldo, et al., "Building three-dimensional images using time-reversal chaotic cavity", IEEE Trans. Ultrason. Ferroelectr. Freq. Control 52, pp. 1489-1497 (2005).
Morgner et al., "Spectroscopic optical coherence tomography," Optics Letters, vol. 25, No. 2, Jan. 15, 2000, pp. 111-113.
Murray et al., "High-Sensitivity Laser-Beamed Acoustic Microscopy Using a Modulated Excitation Source", Applied Physics Letters, vol. 85, No. 14, American Institute of Physics, USA., Oct. 4, 2004, pp. 2974-2976.
Nasiriavanaki, et al., "High-resolution photoacoustic tomography of resting-state functional connectivity in the mouse brain," Proceedings of the National Academy of Sciences, 111(1) 21-26 (Jan. 7, 2014).
Nasse, M. J. et al., "High-resolution Fourier-transform infrared chemical imaging with multiple synchrotron beams," Nat. Methods 8, 413-416 (2011).
Niederhauser et al., "Combined Ultrasound and Optoacoustic System for Real-Time High-Contrast Vasular imaging in Vivo," IEEE Transactions on MedicalImaging, 24(4): 436-440 (2005).
Nowalk, D. et al., "Nanoscale chemical imaging by photoinduced force microscopy," Sci. Adv. 2, Mar. 25, 2016, e1501571, pp. 1-9.
Oraevsky et al., "Optoacoustic Tomography," Biomedical Photonics Handbook, 2003, chapter 34: pp. 931-964, CRC Press LLC, USA.
Oraevsky et al., "Ultimate Sensitivity of Time-Resolved Opto-Acoustic Detection", Biomedical Optoacoustics 2000, pp. 228-239, vol. 3916, SPIE, USA.
Oraevsky et al., "Laser Optoacoustic Tomography of Layered Tissues: Signal Processing" Proceedings of SPIE, 2979: 59-70 (1997).
Oraevsky et al., "Laser opto-acoustic imaging of the breast: Detection of cancer angiogenesis" Proceedings of SPIE, 3597: 352-363 (1997).
Patel, et al., "Pulsed optoacoustic spectroscopy of condensed matter," Rev. Mod. Phys., vol. 53 (1981) pp. 517-550.
Petrov, et al., "Optoacoustic, Noninvasive, Real-Time Continuous Monitoring of Cerebral Blood Oxygenation: An In Vivo Study in Sheep" Aneshesiology, vol. 102, No. 1, Jan. 2005, pp. 69-75.
Potter, et al., "Capillary diameter and geometry in cardiac and skeletal muscle studied by means of corrosion casts" Microvascular Research, 25(1): 68-84 (1983).
Prati, et al., "New advances in the application of FTIR microscopy and spectroscopy for the characterization of artistic materials," Accounts of Chemical Research, vol. 43, (2010), pp. 792-801.
Prevedel, et al., "Simulatenous whole-animal 3D imaging of neuronal activity using light-field microscopy," Nat. Methods 11, 727-730 (Jul. 2014).
Quickenden, et al., "The ultraviolet absorption spectrum ofliquid water," J. Chem. Phys. 72, 4416-4428 (1980).
"Robert, et al., ""Fabrication of Focused Poly (Vinylidene Flouride-Trifluoroethylene) P19 (VDF-TrFE) Copolymer 40-50 MHz Ultrasound Transducers on Curved Surfaces,"" Journal of Applied Physics, vol. 96, No. 1, Jul. 1, 2004, pp. 252-256."
Rockley, M.G., "Fourier-transformed infrared photoacoustic spectroscopy of polystrene film"Chem. Phys. Lett. 68, 455-456 (1979).
Saager et al., "Direct characterization and removal of interfering absoprtion trends in two-layered turbid media" J. Opt. Soc. Am. A, vol. 22, No. 9, Sep. 2005, pp. 1874-1882.
Sakadzic, et al., "Correlation transfer and diffusion of ultrasound-modulated multiply scattered light," Physical Review Letters 96(16) 163902-(1-4) (Apr. 28, 2006).
Savateeva, et al., "Noninvasive detection and staging or oral cancer in vivo with confocal opto-acoustic tomograpahy" Biomedical Optoacoustics, vol. 3916, International Society for Optics and Photonics 2000, pp. 55-66.
Schmidt, et al., "A 32-Channel Time Resolved Instrument for Medical Optical Tomography" Review of Scientific Intruments, vol. 71, No. 1, Jan. 2000, pp. 256-265.
Schroeter, et al., "Spontaneous slow hemodynamic osciillations are impaired in cerebral microangiopathy" Journal of Cerebral Blood Flow & Metabolism (2005) 25, pp. 1675-1864.
Sethuraman et al., "Development of a combined intravascular ultrasound and photoacoustic imaging system" Proceedings of SPIE, 6086: 60860F.1-60860F.10 (2006).
Sethurman et al., "Intravascular photoacoustic imaging of atherosclerotic plaques: Ex vivo study using a rabbit model of atherosclerosis," Proceedings of SPIE, 6437: 643729.1-643729.9 (2007).
Shah, J. et al., "Photoacoustic imaging and temperature measurement for photothermal cancer therapy" Journal of Biomedical Optics, vol. 13, No. 3, (May/Jun. 2008) pp. 034024-1-034024-9.
Sheth, et al., "Columnar Speificity of Microvascular Oxygenation and Volume Responses: Implications for Functional Brain Mapping," The Journal of Neuroscience, vol. 24, No. 3, Jan. 21, 2004, pp. 634-641.
Shi, J., et al., "High-resolution, high-contrast mid-infrared imaging of fresh biological samples with ultraviolet-localized photoacoustic microscopy," Nature Photonics 13 609-615 (May 2019).
Shmueli, et al., "Low Frequency Fluctuations in the Cardiac Rate as a Source of Variance in the Resting-State fMRI BOLD Signal," Neuroimage, vol. 38, No. 2, Nov. 1, 2007, pp. 306-320.
Silva, et al., "Toward Label-Free Super-Resolution Microscopy," ACS Photon. 3, 79-86 (2016).
Sim, et al., "In vivo Microscopic Photoacoustic Spectorscopy for Non-Invasive Glucose Monitoring Invulnerable to Skin Secretion Products," Sci. Rep. 8, 1059 (2018).
Siphanto, et al., "Imaging of Small Vessels Using Photoacoustics: an in Vivo Study" Lasers in Surgery and Medicine, vol. 35, Wiley-Liss, Inc., Netherlands, Dec. 20, 2004, pp. 354-362.
Sommer, A. J., et al., "Attenuated total internal infrared mapping microspectroscopy using an imaging microscope," Appl. Spectrosc. 55, 252-256 (2001).
Song, et al., "Fast 3-D dark-field reflection-mode photoacoustic microscopy in vivo with a 30-MHz ultrasound linear array" Journal of Biomedical Optics, 13(5): 054028.1-054028.5 (2008).
Song et al., "Multi-focal optical-resolution photoacoustic microscopy in vivo." NIH Public Access Author Manuscript, May 13, 2011. pp. 1-7.
Song, et al., "Section-illumination photoacoustic microscopy for dynamic 3D imaging of microcirculation in vivo" Optics Letters, 35(9): 1482-1484 (2010).

(56) References Cited

OTHER PUBLICATIONS

Steinbrink, et al., "Illuminating the BOLD signal: combined fMRI-fNIRS studies" Magnetic Resonance Imaging, vol. 24, No. 4, May 2006, pp. 495-505.
Tam, A. C., "Applications of photoacoustic seensing techniques," Reviews of Modern Physics, vol. 58, No. 2, Apr. 1986, pp. 381-431.
Tearney, et al., "Scanning single-mode fiber optic catheter-endoscope for optical coherence tomography" Optics Letters, 21(7): 543-545 (1996).
Tran, et al., "In vivo endosopic optical coherence tomography by use of a rotational microelctromechanical system probe" Optics Letters, 29(11): 1236-1238 (2014).
"Treeby B. E., Zhang E. Z., Cox B. T., "Photoacoustic tomography in absorbing acoustic media using time reversal", Inverse Probl. 26(11), (2010) (Year: 2010)".
Van Essen, et al., "An Integrated Software Suite for Surface-Based Analyses of Cerebral Cortex" Journal of the Americal Medical Informatics Association, vol. 8, No. 5, Sep./Oct. 2001, pp. 443-459.
Viator et al., "Design testing of an endoscoping photoacoustic probe for determination of treatment depth after photodynamic therapy" Proceedings of SPIE in Biomedical Optoacoustics II, 4256: 16-27 (2001).
Wang, et al., "Ballistic 2-D Imaging Through Scattering Walls Using an Ultrafast Oplical Kerr Gale," Science, vol. 253, Aug. 16, 1991, pp. 769-771.
Wang, L. et al., "Grueneisen relaxation photoacoustic microscopy," Physical Review Letters 113 174301 (Oct. 24, 2014).
Wang, L. V & Yao, J., "A practical guide to photoacoustic tomography in the life sciences," Nat. Methods 13, 627-638 (Jul. 28, 2016).
Wang, L. V., "Multiscale photoacoustic microscopy and computed tomography," Nat. Photon. 3, 503-509 (Aug. 29, 2009).
Wang, L. V.; "Mechanisms of ultrasonic modulation of multiply scattered coherent light: an analytical model," Physical Review Letters 87(4) 043903-(1-4) (Jul. 23, 2001).
Wang, L. V.; "Prospects of a photoacoustic tomography," Medical Physics 35(12), Nov. 19, 2008, pp. 5758-5767.
Wang, L., "Single-cell label-free photoacoustic flowoxigraphy in vivo," Proceedings of National Academy of Sciences 110(15) 5759-5764 (Apr. 9, 2013).
Wang, L., et al., "Ultrasonically encoded photoacoustic flowgraphy in biological tissue," Physical Review Letters 111 204301 (Nov. 15, 2013).
Wang, L.V., Hu, S. "Photoacoustic Tomography: in vivo imaging from organelles to organs," Science 335, 1458-1462 (Mar. 23, 2012).
Wang, X. D., et al., "Noninvasive laser-induced photoacoustic tomograpahy for structural and functional in vivo imaging of the brain," Nature Biotechnology 21(7) 803-806 (Jul. 2003).
Wang, et al., "MCML—Monte Carlo modeling of light transport in multi-layered tissues" Computer Methods and Programs in Biomedicine, vol. 47, No. 2, Jul. 1995, pp. 131-146.
Wang et al., "Three-dimensional laser-induced photoacoustic tomography of mouse brain with the skin and skull intact," Optics Letters, 28(19): 1739-1741 (2003).
Wang et al., "Noninvasive photoacoustic aniography of animal brains in vivo with near-infrared light and an optical contrast agent" Optics Letters, 29(7): 730-732 (2004).
Wang, et al., "Intravascular Photoacoustic Imaging" IEEE J Quantum Electronics, 16(3) 588-599 (2010).
Wetzel, et al., "Imaging molecular chemistry with infrared microscopy," Science, New Series, vol. 285, No. 5431, Aug. 20, 1999, pp. 1224-1225.
Wong, T. et al., "Fast label-free multilayered histology-like imaging of human breast cancer by photoacoustic microscopy," Sci. Adv. 3, 1602168 (May 17, 2017).
Wong, T. et al., "Label-free automated three-dimensional imaging of whole organ by microtomy-assisted photoacoustic microscopy," Nat. Comm. 8, (Nov. 9, 2017).

Wu, Z., et al., "A microbotic system guided by photoacoustic computed tomography for targeted navigation in intestines in vivo," Science Robotics 4(32) eaax0613 (Jul. 24, 2019).
Xia, J. et al., "Photoacoustic tomography: principles and advances," Electromagn. Waves 147, 1 (2014; available in PMC Jan. 30, 2015).
Xia, J., et al., "Wide-field two-dimensional multifocal optical-resolution photoacoustic-computed microscopy," Opt. Lett. 38, 5236-6239 (Dec. 15, 2013).
Xu, et al., "Photoacoustic Imaging in Biomedicine," Review of Scientific Instruments, American Institute of Physics, vol. 77 (2006) pp. 0411010 1-22.
Xu, M. H.; Wang, L. V.; "Time-domain reconstruction for thermoacoustic tomography in a spherical geometry," IEEE Transactions on Medical Imaging 21(7) 814-822 (Jul. 2002).
Xu, M. H.; Wang, L. V.; "Universal back-projection algorithm for photoacoustic computed tomography," Physical Review E 71(1) 016706-1(1-7) (Jan. 19, 2005).
Xu, S., et al., "Thermal expansion of confined water," Langmuir 25, 5076-5083 (2009).
Xu, Y.; Wang, L. V.; "Time-reversed ultrasonically encoded optical focusing into scattering media," Nature Photonics 5(3) 154-157 (Jan. 16, 2011).
Xu, X.; Liu, H.; Wang, L. V.; "Time reversal and its application to tomography with diffracting sources," Physical Review Letters 92(3) 033902-(1-4) (Jan. 23, 2004).
Yadlowsky, et al., "Multiple scattering in coherence microscopy" Applied Optics, vol. 34, No. 25 (1995) pp. 5699-5707. <doi.org/10.1364/AO.34.005699>.
Yang, J. M. et al., "Simulataneous functional photoacoustic and ultrasonic endoscopy of internal organs in vivo," Nature Medicine 18(8) 1297-1303 (Aug. 2012).
Yang, J., et al., "Motionless volumetric photoacoustic microscopy with spatially invariant resolution," Nature Communications 8(1) 780 (Oct. 3, 2017).
Yang, et al., "Novel biomedical imaging that combines intravascular ultrasound (IVUS) and optical coherence tomography (OCT)" IEEE International Ultrasonics Symposium, Beijing, China, Nov. 2-5, 2008, pp. 1769-1772.
Yang, et al., "Time-reversed ultrasonically encoded optical focusing using two ultrasonic transducers for improved ultrasonic axial resolution" Journal of Bioomedical Optics 18(11), 110502 (Nov. 2013) pp. 110502-1-110502-4.
Yao, et al., "Monte Carlo simulation of an optical coherence tomography signal in homogenous turbid media" Phys. Med. Biol. 44(9), Jul. 8, 1999, pp. 2307-2320.
Yao, et al., "Absolute photoacoustic thermometry in deep tissue," Opt. Lett. 38, 5228-5231 (2013).
Yao, et al., "In vivo label-free photoacoustic microscopy of cell nuclei by excitation of DNA and RNA," Opt. Lett. 35, 4139-4141 (2010).
Yao, et al., "Optimal ultraviolet wavelength for in vivo photoacoustic imaging of cell nuclei," J. Biomed. Opt. 17, 056004 (2012).
Yao, et al., "Photoimprint photoacoustic microscopy for three-dimensional label-free sub-diffraction imaging," Physical Review Letters 112(1) 014302 (Jan. 10, 2014).
Yao, L. et al., "Multiscale photoacoustic tomography using reversibly switchable bacterial phytochrome as near-infrared photochromic probe," Nature Methods 13(1) 67-73 (Jan. 2016).
Yao, L. et al., "High-speed label-free photoacoustic microscopy of mouse brain in action," Nat. Methods 12(5), 407-410 (May 12, 2015).
Yao, L. et al., "Photoacoustic microscopy: superdepth, superresolution, and superb contrast", IEEE Pulse 6, 34-7 (May 13, 2015).
Yaqoob, et al., "Methods and applications of endoscopic optical coherence tomography" Journal of Biomedical Optics, 11(6): 063001.1-063001.19 (2006).
Yavuz, M. S., et al., "Gold nanocages covered by smart polymers for controlled release with near-infrared light," Nature Materials 8(12) 935-939 (Nov. 1, 2009).
Yodh, et al., "Spectroscopy and Imaging with Diffusing Light" Physics Today 48(3), Mar. 1995, pp. 34-40.

(56) References Cited

OTHER PUBLICATIONS

Zeff, et al., "Retinotopic mapping of adult human visual cortex with high-density diffuse optical tomography" PNAS, vol. 104, No. 29, Jul. 17, 2007, pp. 12169-12174.
Zemp, et al., "Realtime photoacoustic microscopy in vivo with a 30MHZ ultrasonic array transducer" Optics Express, 16(11): 7915-7928 (2008).
Zhang, C., "Cohert Raman scattering microscopy in biology and medicine," Annu. Rev. Biomed. Eng. 17, 415-445 (2015).
Zhang, D. et al., "Depth-resolved mid-infrared photothermal imaging of living cells and organisms with submicrometer spatial resolution," Sci. Adv. 2, e1600521 (2016).
Zhang, H. F. et al., "Functional photoacoustic microscopy for high-resolution and noninvasive in vivo imaging," Nature Biotechnology 24(7) 848-851 (Jul. 2006).
Zhang, H. F. et al., "In vivo imaging of subcutanous structure using functional photoacoustic microscopy," Nature Protocols 2(4) 797-804 (Apr. 5, 2007).
Zhang, et al., "Intrinsic Functional Relations Between Human Cerebral Cortex and Thalamus" Journal of Neurophysiology, vol. 100, No. 4, Oct. 2008, pp. 1740-1748.
Zharov, et al., "In vivo photoacoustic flow cytometry for monior of circulating single cancer cells and contrast agents," Optics Letters, 31(24):3623-3625 (2006).
Zou, et al., "BOLD responses to visual stimulations in survivors of childhood cancer" NeuroImage, vol. 24, No. 1, Jan. 1, 2005, pp. 61-69.
Office Action from related U.S. Appl. No. 11/625,099, dated Nov. 1, 2010.
Final Office Action from related U.S. Appl. No. 11/625,099, dated Apr. 20, 2010.
Office Action from related U.S. Appl. No. 12/254,643, dated Aug. 6, 2010.
Notice of Allowance from related U.S. Appl. No. 12/254,643, dated Nov. 22, 2010.
Office Action from related U.S. Appl. No. 12/568,069, dated Dec. 21, 2012.
Office Action from related U.S. Appl. No. 12/568,069, dated Mar. 29, 2012.
Final Office Action from related U.S. Appl. No. 12/568,069, dated Sep. 18, 2012.
Notice of Allowance from related U.S. Appl. No. 12/568,069, dated Feb. 22, 2013.
Office Action from related U.S. Appl. No. 12/739,589, dated Jul. 19, 2012.
Notice of Allowance from related U.S. Appl. No. 12/739,589, dated Feb. 5, 2013.
Office Action from related U.S. Appl. No. 13/125,522, dated Jan. 22, 2013.
Final Office Action from related U.S. Appl. No. 13/125,522, dated May 23, 2013.
Office Action from related U.S. Appl. No. 13/125,522, dated Jul. 17, 2014.
Final Office Action from related U.S. Appl. No. 13/125,522, dated Oct. 29, 2014.
Office Action issued dated Aug. 26, 2015 in U.S. Appl. No. 13/125,522.
Final Office Action dated Mar. 3, 2016 issued in U.S. Appl. No. 13/125,522.
Notice of Allowance dated Sep. 19, 2016 issued in U.S. Appl. No. 13/125,522.
Office Action from related U.S. Appl. No. 13/143,832, dated Apr. 18, 2014.
Office Action from related U.S. Appl. No. 13/369,558, dated Jun. 20, 2014.
Notice of Allowance from related U.S. Appl. No. 13/369,558, dated Jul. 29, 2014.
Office Action from related U.S. Appl. No. 13/450,793, dated Jun. 5, 2013.
Final Office Action from related U.S. Appl. No. 13/450,793, dated Nov. 22, 2013.
Office Action from related U.S. Appl. No. 13/450,793, dated Mar. 24, 2014 (22 pages).
Office Action from related U.S. Appl. No. 13/450,793, dated Aug. 1, 2014 (21 pages).
Office Action from related U.S. Appl. No. 13/574,994, dated Mar. 17, 2014.
Final Office Action from related U.S. Appl. No. 13/574,994, dated Aug. 26, 2014.
Notice of Allowance dated Nov. 17, 2015 from U.S. Appl. No. 15/574,994.
Office Action dated Jan. 20, 2015, from related U.S. Appl. No. 14/026,577.
Final Office Action dated Sep. 30, 2015, from related U.S. Appl. No. 14/026,577.
Notice of Allowance dated Jan. 5, 2016, from U.S. Appl. No. 14/026,557.
Office Action dated Nov. 13, 2017, from U.S. Appl. No. 15/148,685.
Final Office Action dated Sep. 24, 2018, from related U.S. Appl. No. 15/148,685.
Notice of Allowance dated May 16, 2019, from U.S. Appl. No. 15/148,685.
Office Action from related U.S. Appl. No. 13/637,897, dated Aug. 1, 2014 (7 pages).
Office Action from related U.S. Appl. No. 14/164,117, dated Dec. 11, 2015 (18 pages).
Amendment and Request for Contitnued Examination dated Nov. 25, 2019 in U.S. Appl. No. 14/436,581.
Guo, et al., "Calibration-free absolute quantification of optical absorprtion coefficients using acoustic spectra in three-dimensional photoacoustic microscopy of biological titssue" Opt. Lett. 2010; 35(12): 2067-2069. <doi:10.1364/OL.35.002067>.
Karamata, et al., "Multiple Scattering in Coherence Tomography I Investigation and Modeling" Journal of Optical Society, vol. 22, No. 7 (2005), pp. 1369-1379.
Laser Institue of America, "Americal National Standard for the same use of lasers," American National Standard Institue (ANSI Z136.1-2007 Revision of ANSI Z136.1-2000).
Nakajima, et al., "Three-dimensional analysis and classification of arteries in the skin and subcutaneous adipofascial tissue by computer graphics imaging," Plastic Reconstructive Surgery, 102(3): 748-760 (1998).
Stern, MD., "In vivo evaluation of microcirculation by coherent light scattering," Nature, 254(5495): 56-68 (1975).
Wang, et al., "Biomedical Optics, Principes and Imaging," Wiley-Interscience, A John Wiley & Sons, Inc., (2007) p. 7.
Yang, "Optical coherence and Doppler tomography for monitoring tissue changes induced by laser thermal therapy—An in vivo feasability study" Review of Scientific Instruments, vol. 74, No. 1, Jan. 2003, p. 437-440.
Yodh et al., "Functional Imaging with Diffusing Light" Biomedical Photonics Handbook, 2003, Ch. 21, pp. 45, CRC Press, Boca Raton.
Xu et al.. "Time Reversal Ultrasound Modulated Optical Tomography Using a BSO Phrase Conjugate Mirro," poster presented at SPIE Conference 7177 on Jan. 26, 2009.
U.S. Appl. No. 16/798,204, filed Feb. 21, 2020, Wang et al., US20200268523.
U.S. Appl. No. 16/806,796, filed Mar. 2, 2020, Wang et al., US20200275846.
Office Action dated Oct. 3, 2018 issued in U.S. Appl. No. 14/436,581.
Notice of Allowance dated Dec. 5, 2014 issued in U.S. Appl. No. 13/369,558.
Office Action dated Apr. 21, 2017 issued in U.S. Appl. No. 14/639,676.
Final Office Action dated Nov. 15, 2017 issued in U.S. Appl. No. 14/639,676.
Office Action dated May 31, 2018 issued in U.S. Appl. No. 14/639,676.
Notice of Allowance dated Dec. 12, 2018 issued in U.S. Appl. No. 14/639,676.
Office Action dated Feb. 28, 2020 issued in U.S. Appl. No. 16/372,597.
Office Action dated Aug. 19, 2019 issued in U.S. Appl. No. 16/372,597.

(56) References Cited

OTHER PUBLICATIONS

Office Action dated Oct. 8, 2020 issued in U.S. Appl. No. 16/372,597.
International Search Report and Written Opinion dated Aug. 31, 2020, issued in Application No. PCT/US2020/019368.
International Search Report and Written Opinion dated Oct. 14, 2020, issued in Application No. PCT/US2020/07174.
International Search Report dated Aug. 9, 2018 issued in Application No. PCT/US2018/032007.
Written Opinion of the International Searching Authority dated Aug. 9, 2018 issued in Application No. PCT/US2018/032007.
International Preliminary Report on Patentability dated Nov. 12, 2019 issued in PCT/US2018/032007.
Abdelmohsen, et al., "Micro- and nano-motors for biomedical applications," J. Mater. Chem. B 2, (2014) pp. 2395-2408.
Alomair, et al., "In vivo high angular resolution diffusion-weighted imaging of mouse brain at 16.4 Tesla," PloS One 10, Jun. 25, 2015, e0130133, pp. 1-17.
Baheiraei, et al., "Investigation of magnesium incorporation within gelatin/calcium phosphate nanocomposite scaffold for bone tissue engineering," Int. J. Appl. Ceram. Technol. 12, (2015) pp. 245-253.
Bansil, et al., "The biology of mucus: Composition, synthesis and organization" Adv. Drug Deliv. Rev. 124, (2018) pp. 3-15.
Bellinger, et al., "Oral, ultra-long-lasting drug delivery: Application toward malaria elimination goals" Sci Transl. Med. 8(365), Nov. 16, 2016, 365ra157, pp. 1-25. <doi:10.1126/scitranslmed.aag2374>.
Brenner, et al., "Computed Tomography—An Increasing Source of Radiation Exposure" N. Engl. J. Med 357;22, Nov. 29, 2007, pp. 2277-2284.
Celli, J. P., et al., "Helicobacter pylori moves through mucus by reducing mucin viscoelasticity," Proc. Natl. Acad. Sci. U. S. A. 106, (2009) pp. 14321-14326.
Chourasia, et al., "Design and Development of Multiparticulate System for Targeted Drug Delivery to Colon," Drug Delivery, 11:3, (2004) pp. 201-207.
Cui, Y., et al. "Transferring-conjugated magnetic silica PLGA nanoparticles loaded with doxorubicin and paclitaxel for brain glioma treatment," Biomaterials 34, (2013) pp. 8511-8520.
de Avila, et al., "Micromotor-enabled active drug delivery for in vivo treatment of stomach infection" Nat. Commun. 8: 272, (2017) pp. 1-9.
de Zerda, et al., "Family of enhanced photoacoustic imaging agents for high-sensitivity and multiplexing studies in living mice," ACS Nano 6(6), Jun. 26, 2012, pp. 4694-4701.
Eghtedari, et al., "High Sensitivity of In Vivo Detection of Gold Nanorods Using a Laser Optoacoustic Imaging System," Nano Letters, vol. 7, No. 7, 2007, pp. 1914-1918.
Fan, et al., "Sub-Cellular Resolution Delivery of a Cytokine via Precisely Manipulated Nanowires" Nat. Nanotechnol. 5(7), Jul. 2010, 545-551. <doi: 10.1038/nnano.2010.104>.
Gaihre, et al., "Gelatin-coated magnetic iron oxide nanoparticles as carrier system: Drug loading and in vitro drug release study," Int. J. Pharm. 365, (2009) pp. 180-189.
Gao, et al., "A review of snapshot multidimensional optical imaging: measuring photon tags in parallel" Phys Rep. 616, Feb. 29, 2016, pp. 1-37. <doi:10.1016/j.physrep.2015.12.004>.
Gao, et al., "Artificial micromotors in the mouse's stomach: A step toward in vivo use of synthetic motors,"ACS Nano 9, (2015) pp. 117-123.
Guo, et al., "CsxWO3 nanorods coated with polyelectrolyte multilayers as a multifunctional nanomaterial for bimodal imaging-guided photothermal/photodynamic cancer treatment," Adv. Mater. 29, 1604157 (2017).
Hong, et al., "Simple Method to Produce Janus Colloidal Particles in Large Quantity" Langmuir 22, (2006) pp. 9495-9499.
Hu, C., et al., "Soft Micro- and Nanorobotics," Annu. Rev. Control. Robot. Auton. Syst. 1, (2018) pp. 53-75.
Hu, W., et al., "Small-scale soft-bodied robot with multimodal locomotion," Nature 554, 81-85, (2018).
Ji, T. et al. "Preparation, Characterization, and Application of Au-Shell/Polystyrene Beads and Au-hell/Magnetic Beads" Adv. Mater. 13(16), Aug. 2001, pp. 1253-1256.
Karshalev, E. et al., "Micromotor Pills as a Dynamic Oral Delivery Platform" American Chemical Society Nano, 2018, vol. 12, No. 8, pp. 8397-8405 <DOI: 10.1021/acsnano.8b03760>.
Kirch, J., et al., "Optical tweezers reveal relationship between microstructure and nanoparticle penetration of pulmonary mucus," Proc. Natl. Acad. Sci. 109, (2012)p. 18355-18360.
Koziolek, et al., "Navigating the human gastrointestinal tract for oral drug delivery: Uncharted waters and new frontiers," Adv. Drug Delivery Rev. 101, (2016) pp. 75-88.
Kruger, et al., "Thermoacoustic CT: imaging principles," Proc. SPIE 3916, (2000) pp. 150-160.
Kuppusami, S. et al., "Parylene Coatings in Medical Devices and Implants: A Review" Universal Journal of Biomedical Engineering, 2015, vol. 3, No. 2, pp. 9-14 <DOI: 10.13189/ujbe.2015.030201>.
Lai, S. et al., "Mucus-penetrating nanoparticles for drug and gene delivery to mucosal tissues," Adv. Drug Deliv. Rev. 61(2), Feb. 27, 2009, pp. 158-171. <doi:10.1016/j.addr.2008.11.002>.
Lai, P. et al., "Dependence of optical scattering from Intralipid in gelatin-gel based tissue-mimicking phantoms on mixing temperature and time" Journal of Biomedical Optics, vol. 19, No. 3, Mar. 2014, pp. 035002-1-035002-6.
Leal, et al., "Physicochemical properties of mucus and their impact on transmucosal drug delivery," Int. J. Pharm. 532, (2017) pp. 555-572.
Li, "An Enteric Micrometer Can Selectively Position and Spontaneously Propel in the Gastointestinal Tract," ACS Nano. 10(10), Oct. 25, 2016, pp. 9536-9542. <doi:10.1021/acsnano.6b04795>.
Li, et al., "Autonomous Collision-Free Navigation Microvehicles in Complex and Dynamically Changing Envrionments" ACS Nano, 11, (2017) pp. 9268-9275.
Li, J. et al., "Micromotors Spontanously Neutralize Gastric Acid for pH-Responsive Payload Release" Angew Andte Chemie International Edition, vol. 56, No. 8, 2017, pp. 2156-2161. <DOI: 10.1002/anie.201611774>.
Li, J. et al., "Micro/Nanorobots for Biomedicine: Delivery, Surgery, Sensing, and Detoxification" Sci Robot, 2(4), Mar. 15, 2017, pp. 1-20 <doi:10.1126/scirobotics.aam6431>.
Liu, et al., "Label-free cell nuclear imaging by Gröneisen relaxation photoacoustic microscopy" Opt Lett. Feb. 15, 2018; 43(4), (2018) pp. 947-950.
Medina-Sanchez, et al., "Medical microbots need better imaging and control," Nature 545, (2017) pp. 406-408.
Ntziachristos, V., "Going deeper than microscopy: the optical imaging frontier in biology" Nature Methods vol. 7, No. 8, Aug. 2010, pp. 603-614.
Paxton, et al., "Catalytic nanomotors: Autonomous movement of striped nanorods," J. Am. Chem. Soc. 126, 13424-13431 (2004).
Razansky, et al., "Multispectral opto-acoustic tomography of deep-seated fluorescent proteins in vivo," Nature Photonics 3, (2009) pp. 412-417.
Rosenblum, et al., "Progress and challenges towards targeted delivery of cancer therapeutics" Nat. Commun. 9, (2018) 1410. pp. 1-12.
Sanchez, et al., "Chemically powered micro- and nanomotors," Agnew. Chem. Int. Ed. 54, (2015) pp. 1414-1444.
Schambach, et al., "Application of micro-CT in small animal imaging" Methods, vol. 50, No. 1, Jan. 2010, pp. 2-13.
Servant, et al., "Controlled In Vivo Swimming of a Swarm of Bacteria-Like Microrobotic Flagella" Advanced Materials 27, (2015) pp. 2981-2988.
Sezer, et al., "Review of magnesium-based biomaterials and their applications," J. Magnesium Alloys 6, (2018) pp. 23-43.
Sitti, M., "Miniature soft robots-road to the clinic," Nat. Rev. Mater, 3, (2018) pp. 74-75.
Smith, et al., "Beyond, C, H, O, and Ni analysis of the elemental composition of U.S. FDA approved drug architectures," J. Med. Chem. 57, pp. 9764-8773 (2014).
Soppimath, et al., "Microspheres as floating drug-delivery systems to increase gastric retention of drugs," Drug Metab. Rev. 33, (2001) pp. 149-160.

(56) References Cited

OTHER PUBLICATIONS

Tay, et al., "Magnetic Particle Imagiing Guided Heating In Vivo using Gradient Friends For Abritrary Localization of Magnetitc Hyperthermia Therapy" ACS Nano. 12(4), Apr. 24, 2018, pp. 3699-3713. <doi:10.1021/acsnano.8b00893>.
Tu, et al., "Self-propelled supramolecular nanomotors with temperature-responsive speed regulation," Nat. Chem. 9, 480 (2016).
Velasco, E., "Ultrafast Camera Takes 1 Trillion Frames Per Second of Transparent Objects and Phenomena" [Webpage] Caltech, California Institue of Technology, Jan. 17, 2020, pp. 1-2. <URL:https://www.eurekalert.org/pub_releases/2020-01/ciot-uct012120.php>.
Vilela, et al., "Medical imaging for the tracking of micromotors," ACS Nano 12, (2018) pp. 1220-12227.
Wang, et al., "Fabrication of micro/nanoscale motors" Chem. Rev. 115, (2015) pp. 8704-8735.
Wang, B. et al., 'Recent progress on micro- and nano-robotst: towards in vivo tracking and localizationn', Quantitative Imaging in Medicine and Surgery, 2018, vol. 8, No. 5, pp. 461-479. <DOI: 10.21037/qims.2018.06.07>.
Wang, et al., "Nano/microscale motors: biomedical opportunitues and challenges," ACS Nano 6, (2012) pp. 5745-5751.
Wu, D., et al., "In vivo Mapping of Macroscoping Neuronal Projections in the Mouse Hippocampus using High-resolution Diffusion MRI," Neuroimaging 125, Jan. 15, 2016, pp. 84-93.
Xu, et al., "Rhesus monkey brain imaging through intact skull with thermoacoustic tomography," IEEE Trans. Ultrason. Ferroelectr. Freq. Control, vol. 53, No. 3, Mar. 2006, pp. 542-548.
Yan, et al., "Multifunctional biohybrid magnetite microrobots for imaging-guided therapy" Yan et al., Sci. Robot. 2, eeaq1155, Nov. 22, 2017, pp. 1-14.
Yang, et al., "The grand challenges of science robotics," Science Robotics 3, Jan. 31, 2018, eaar7650, pp. 1-14.
Yin, et al., "Agarose particle-templated porous bacterial cellulose and its application in cartilage growth in vitro" Acta Biomater. Jan. 12, 2015, pp. 129-138. <doi: 10.1016/j.actbio.2014.10.019>.
U.S. Appl. No. 16/946,496, filed Jun. 24, 2020, Gao et al.
Arridge, et al., "Accelerated high-resolution photoacoustic tomography via compressed sensing," ArXiv Prepr. ArXiv 160500133, 2016, pp. 8908-8940.
Cox, et al., "Artifact trapping during time reversal photoacoustic imaging for acoustically heterogeneous media," IEEE Trans. Med. Imaging, vol. 29, No. 2, (2010) pp. 387-396.
Deán-Ben, et al., "Functional optoacoustic neuro-tomography for scalable whole-brain monitoring of calcium indicators," Light Sci. Appl., vol. 5, No. 12, p. e16201, 2016, pp. 1-7.
Deán-Ben, et al., "Portable spherical array probe for volumetric real-time optoacoustic imaging at centimeter-scale depths," Opt. Express, vol. 21, No. 23, 2013, p. 28062-28071.
Deserno, M., "How to generate equidistributed points on the surface of a sphere," Polym. Ed, p. 99, 2004, p. l.
Han, Y. et al., "Three-dimensional optoacoustic reconstruction using fast sparse representation," Opt. Lett., vol. 42, No. 5, (2017) pp. 979-982.
Han, et al., "Optoacoustic image reconstruction and system analysis for finite-aperture detectors under the wavelet-packet framework," J. Biomed. Opt., vol. 21, No. 1, Jan. 2016, pp. 016002-1-016002-9.
Huang, et al., "Full-wave iterative image reconstruction in photoacoustic tomography with acoustically inhomogeneous media," IEEE Trans. Med. Imaging, vol. 32, No. 6, Jun. 2013, pp. 1097-1110.
R. A. Kruger, et al., "Dedicated 3D photoacoustic breast imaging," Med. Phys., vol. 40, No. 11, 2013, pp. 113301-1-113301-8.
Maslov, et al., "Label-free automated three-dimensional imaging of whole organs by microtomy-assisted photoacoustic microscopy," Nature Communications 8(1) 1386 (2017), pp. 1-8.
Matthews, et al., "Parameterized Joint Reconstruction of the Initial Pressure and Sound Speed Distributions for Photoacoustic Computed Tomography," SIAM J. Imaging Sci., vol. 11, No. 2, (2018) pp. 1560-1588.

Matsumoto, et al., "Label-free photoacoustic imaging of human palmar vessels: a structural morphological analysis," Sci. Rep., vol. 8, No. 1, (2018) p. 786.
Mitsuhashi, et al., "A forward-adjoint operator pair based on the elastic wave equation for use in transcranial photoacoustic computed tomography," SIAM J. Imaging Sci., vol. 10, No. 4, 2017, pp. 2022-2048.
Mitsuhashi, et al., "Investigation of the far-field approximation for modeling a transducer's spatial impulse response in photoacoustic computed tomography," Photoacoustics, vol. 2, No. 1, 2014, pp. 21-32.
Ogunlade, et al., "In vivo three-dimensional photoacoustic imaging of the renal vasculature in preclinical rodent models," Am. J. Physiol.-Ren. Physiol., vol. 314, No. 6, (2018) pp. F1145-F1153.
Pramanik, M., "Improving tangential resolution with a modified delayand-sum reconstruction algorithm in photoacoustic and thermoacoustic tomography," JOSA A, vol. 31, No. 3, (2014) pp. 621-627.
Scholte, et al., "On spatial sampling and aliasing in acoustic imaging" 12th Intern, congress on sound and vibration, Lisbon, Portugal (2005) pp. 1-8.
Schoeder, et al., "Optoacoustic image reconstruction: the full inverse problem with variable bases," Proc. R. Soc. A, vol. 474, No. 2219, (2018) pp. 1-20.
Treeby, et al., "k-Wave: MATLAB toolbox for the simulation and reconstruction of photoacoustic wave fields," J. Biomed. Opt., vol. 15, No. 2, Mar./Apr. 2010, pp. 021314.
Treeby, et al., "Advanced photoacoustic image reconstruction using the k-Wave toolbox," in Photons Plus Ultrasound: Imaging and Sensing 2016, 2016, vol. 9708, p. 97082P.
Tzoumas, et al., "Eigenspectra optoacoustic tomography achieves quantitative blood oxygenation imaging deep in tissues," Nat. Commun., vol. 7, 2016, pp. 1-10.
Wang et al., "Biomedical optics: principles and imaging," Section 12.5; Photoacoustic Tomography, John Wiley & Sons (2012) pp. 288-290.
Wang, K. et al., "Investigation of iterative image reconstruction in three-dimensional optoacoustic tomography," Phys. Med. Biol., vol. 57, No. 17, 2012, p. 5399-5423.
Xu, et al., "Exact frequency-domain reconstruction for thermoacoustic tomography-II: Cylindrical geometry," IEEE Trans. Med. Imaging, vol. 21, No. 7, (2002) pp. 829-833.
Yang, J.M., et al., "Focusing light inside live tissue using reversibly switchable bacterial phytochrome as a genetically encoded photochromic guide star" Science Advances 5(12) (2019) pp. 1-9.
Zhou, et al., "Tutorial on photoacoustic tomography," J. Biomed. Opt., vol. 21, No. 6, Jun. 2016, pp. 061007-1-061007-14.
Notice of Allowance dated Jan. 26, 2021 issued in U.S. Appl. No. 14/436,581.
U.S. Appl. No. 17/090,752, filed Nov. 5, 2020, Wang et al.
International Search Report and Written Opinion dated Mar. 2, 2021 issued in PCT/US2020/059214.
Guo, et al., "Calibration-free absolute quantification of optical absorption coefficients using acoustic spectra in three-dimensional photoacousic microscopy of biological tissue" Opt. Lett. 2010; 35(12): 2067-2069. <doi:10.1364/OL.35.002067>.
Hoelen, et al., "Three-Dimensional Photoacoustic Imaging of Blood Vessels in Tissue" Optics Letters, 1998, pp. 648-650, vol. 23, No. 8, Optical Society of America, USA.
Karamata, et al., "Multiple Scattering in Coherence Tomography I Investigation and Modeling" Journal of Optical Society, vol. 22, No. 2 (2005), pp. 1369-1379.
Kruger et al., "Photoacoustic Ultrasound (PAUS)-Reconstruction Tomography" Med. Phys., Oct. 1995, vol. 22(10) Am. Assoc. Phys. Med., USA, pp. 1605-1609.
Kruger, et al., "Thermoacoustic computed tomography—technical considerations" Medical Physics, 26(9): 1832-1837 (1999).
Kruger et al., "Thermoacoustic computed tomography using a conventional linear transducer array," Medical Physics, 856-860 (2003).
Kruger, et al., "Breast Cancer in Vivo: Contrast Enhancement with Thermoacoustic CT at 434 MHz-Feasability Study," Radiology, 216(1): 279-283 (2000).

(56) References Cited

OTHER PUBLICATIONS

Laser Institue of America, "American National Standard for the safe use of lasers," American National Standard Institue (ANSI Z136.1-2007 Revision of ANSI Z136.1-2000).

Nakajima, et al., "Three-dimensional analysis and classifcation of arteries in the skin and subcutaneous adipofascial tissue by computer graphics imaging," Plastic Reconstructive Surgery, 102(3): 748-760 (1998).

Nelson et al., "Imaging Glioblastoma Multiforme," The Cancer Journal vol. 9, No. 2, Mar./Apr. 2003, pp. 134-145.

Stern, MD., "In vivo evaluation of microcirculation by conherent light scattering," Nature, 254(5495): 56-58 (1975).

Xu, et al.. "Time Reversal Ultrasound Modulated Optical Tomography Using a BSO Phase Conjugate Mirror," poster presented at SPIE Conference 7177 on Jan. 26, 2019, 1 page.

Yang, "Optical coherence Doppler tomography for monitoring tissue changes induced by laser thermal—An in vivo feasability study" Review of Scientific Instruments, vol. 74, No. 1, Jan. 2003, p. 437-440.

Yodah et al., "Functional Imaging with Diffusing Light" Biomedial Photonics Handbook, 2003, Ch. 21, pp. 45, CRC Press, Boca Raton.

U.S. Appl. No. 17/302,041, filed Apr. 22, 2021, Wang et al.

\* cited by examiner

SYSTEMS AND METHODS OF GRUENEISEN-RELAXATION PHOTOACOUSTIC MICROSCOPY AND PHOTOACOUSTIC WAVEFRONT SHAPING

CROSS REFERENCE TO RELATED APPLICATIONS

This application is a 35 U.S.C. § 371 national stage application of PCT Application No. PCT/US2014/066437, filed Nov. 19, 2014, which claims the benefit of U.S. Provisional Application No. 61/906,238 filed on Nov. 19, 2013, both of which are incorporated herein by reference in their entirety.

GOVERNMENTAL RIGHTS IN THE INVENTION

This invention was made with government support under Grant Nos. CA159959, CA186567, EB016986 awarded by National Institutes of Health. The government has certain rights in the invention.

FIELD OF THE INVENTION

The invention generally relates to systems and methods for improving photoacoustic resolution.

BACKGROUND OF THE INVENTION

Confocal microscopy has broad applications in life science, semiconductor inspection, and materials science. It offers better optical resolution and signal-to-background ratio than wide-field microscopy. However, confocal microscopic contrast has been limited to back-scattering and fluorescence; it cannot image non-radiative absorption contrast with sufficient sensitivity.

Via non-radiative relaxation, excited molecules convert absorbed energy to heat. In biological tissue, almost all endogenous molecules absorb photons at certain wavelengths and generate heat, but only a few produce strong radiative contrasts, such as fluorescence. Hence, the ability to image non-radiative absorption contrast should extend microscopy to broader applications.

Recent development of optical-resolution photoacoustic microscopy (OR-PAM) has enabled imaging with absorption contrasts. However, like wide-field optical microscopy, OR-PAM lacks optically defined axial resolution when imaging planar objects—i.e., objects wider than the lateral resolution. The arrival time of the photoacoustic (PA) signal offers depth information, whose resolution is determined by the bandwidth of the ultrasound transducer as limited by the depth of the absorber in tissue. Specifically, the frequency dependence of acoustic attenuation limits the usable ultrasound bandwidth, leading to poor axial resolution. Two-photon absorption has been employed in OR-PAM to achieve better resolution. Yet, it is challenging to effectively separate the two-photon PA signal from the predominant single-photon signal. A transient absorption method was proposed to improve axial resolution. This method relies on the ground state recovery time, which may be applicable to only limited types of molecules. Therefore, there is a need for an imaging system that extends microscopy to imaging a wide variety of non-radiative absorbers with confocal resolution.

SUMMARY OF THE INVENTION

In an aspect, the present disclosure provides a method of focusing a light pulse within a focus area using nonlinear photoacoustic wavefront shaping (PAWS) including obtaining an initial GR-PA feedback signal using an initial wavefront from within the focus area; obtaining at least one subsequent GR-PA feedback signal, each subsequent GR-PA feedback signal obtained using a subsequent wavefront determined by altering a preceding wavefront according to a wavefront optimization rule using an immediately preceding GR-PA feedback signal obtained using the preceding wavefront; selecting an optimized wavefront according to an optimization criterion; and focusing the light pulse comprising the optimized wavefront within the focus area at a single-speckle resolution.

A GR-PA signal is obtained by: delivering a first laser pulse comprising one wavefront to the focus area; detecting a first photoacoustic signal induced by illumination of the focus area by the first laser pulse; delivering a second laser pulse comprising the one wavefront to the focus area at a lag interval time after the delivery of the first laser pulse; detecting a second photoacoustic signal induced by illumination of the focus area by the second laser pulse; and subtracting a first peak-to-peak amplitude of the first photoacoustic signal from a second peak-to-peak amplitude of the second photoacoustic signal to obtain the GR-PA signal. Each subsequent wavefront produces a subsequent GR-PA signal higher than any preceding GR-PA signal. The wavefront optimization rule includes a genetic algorithm. The optimization criterion is chosen from: the optimized wavefront is the wavefront determined after a maximum number of GR-PA signals have been obtained; the optimized wavefront is the wavefront for which a difference in the GR-PA signal associated with the optimized wavefront and the immediately preceding GR-PA signal is less than a minimum GR-PA signal difference; and the optimized wavefront produces a GR-PA signal greater than a minimum threshold GR-PA signal. The maximum number of GR-PA signals ranges from about 100 to about 2000. The optimized wavefront is obtained in an optimization time less than a speckle decorrelation time. The first laser pulse and the second laser pulse include a laser fluence, where the laser fluence may be decreased between obtaining one or more subsequent feedback signals to avoid overheating the sample. The lag interval time is less than about 20 to about 50 µs. Each wavefront includes a spatial phase pattern generated by delivering a laser pulse through a configurable spatial light modulator. The initial wavefront is chosen from a random spatial phase pattern and an optimal spatial phase pattern obtained by a linear photoacoustic wavefront shaping method. The linear photoacoustic wavefront shaping method includes a time-reversed ultrasonically encoded (TRUE) optical focusing method. The optimized GR-PA signal obtained using the optimized waveform is at least 100 times greater than the initial GR-PA signal. The focus region of the GR-PA signal includes a lateral resolution corresponding to a single speckle. The focus region of the GR-PA signal includes a lateral resolution of less than about 10 µm. The focus region of the GR-PA signal is centered within an acoustic focus region of an acoustic transducer used to obtain photoacoustic signals. The method may further include centering the focus region within the acoustic focus region by: obtaining a plurality of scanned PA signals using the optimized wavefront scanned across the acoustic focus region at a plurality of scan locations; and using the scan location associated with the highest PA signal of the plurality of scanned PA signals to center the focus region within the acoustic focus region. The optimized wavefront is scanned across the acoustic focus region by applying a linear phase ramp to an optimized spatial phase pattern associated with the optimized wavefront. A high-fluence laser pulse comprising the optimized waveform is delivered to the focus region to perform a laser microsurgery. The laser microsurgery includes a photocoagulation of small blood vessels, a photoablation of tissue, and any combination thereof.

In another aspect, the present disclosure provides a method of Grueneisen-relaxation photoacoustic microscopy (GR-PAM) of a subject including delivering a first laser pulse to a focus region; detecting a first photoacoustic signal induced by illumination of the focus region by the first laser pulse; after a lag interval time after the delivery of the first laser pulse, delivering a second laser pulse to the focus region; detecting a second photoacoustic signal induced by illumination of the focus region by the second laser pulse; and subtracting a first peak-to-peak magnitude of the first photoacoustic signal from a second peak-to-peak magnitude of the second photoacoustic signal to obtain a GR-PA signal corresponding to the focus region.

The lag interval time is less than a thermal relaxation time of the subject. The lag interval time is less than about 5 μs to about 20 μs. The first laser pulse heats the focus region from a first temperature to a second temperature, where the first temperature and the second temperature are both within a linear temperature range at which the Grueneisen parameter varies linearly with respect to temperature. The linear temperature ranges from about 10° C. to about 55° C. for a biological tissue comprising water, fatty tissues, or any combination thereof. The second temperature is no more than about 5° C. higher than the first temperature. The first laser pulse and the second laser pulse each include a pulse width of less than about 5 ns to about 10 ns. The first laser pulse includes a first laser pulse energy and the second laser pulse includes a second laser pulse energy that is essentially equal to the first laser pulse energy. The second laser pulse energy ranges from about 1% to about 100% of the first laser pulse energy. The first laser pulse and the second laser pulse further include a pulse wavelength ranging from about 400 nm to about 1300 nm. The lateral resolution of the GR-PAM is about $1/\sqrt{2}$ times the lateral resolution of OR-PAM performed using similar process parameters. The lateral resolution of the GR-PAM is less than about 0.5 μm. The axial resolution of the GR-PAM is at least 10 times finer than the axial resolution of OR-PAM performed using similar process parameters. The axial resolution of the GR-PAM is less than about 5 μm. The GR-PAM performs optical sectioning, where an axial FWHM of the GR-PA signal obtained from a planar target is about twice the Rayleigh range of a light beam comprising the first laser pulse and the second laser pulse.

In another aspect, the present disclosure provides a method of obtaining an absorption coefficient of a sample using Grueneisen-relaxation photoacoustic microscopy (GR-PAM) including obtaining a plurality of GR-PA signals, each GR-PA signal obtained at a focus region situated at a different penetration depth z within the sample; fitting the plurality of GR-PA signals and associated penetration depths z to a first equation to determine an optical absorption coefficient: $\Delta PA(z) = A e^{(-2\mu_a z)}$ where $\Delta PA(z)$ is the GR-PA signal at the penetration depth z and A is an amplitude corresponding to the GR-PA signal measured at z=0; and calculating the optical absorption coefficient from the fitted first equation.

Each GR-PA signal at each penetration depth z is obtained by: delivering a first laser pulse to the focus region at the penetration depth z; detecting a first photoacoustic signal induced by illumination of the focus region by the first laser pulse; after a lag interval time after the delivery of the first laser pulse, delivering a second laser pulse to the focus region; detecting a second photoacoustic signal induced by illumination of the focus region by the second laser pulse; and subtracting a first peak-to-peak magnitude of the first photoacoustic signal from a second peak-to-peak magnitude of the second photoacoustic signal to obtain each GR-PA signal. The method may further include determining the concentration of a plurality of molecules in the sample using the obtained absorption coefficient. The plurality of molecules include a known molar extinction spectrum. The plurality of molecules are selected from: oxy-hemoglobin or deoxy-hemoglobin.

BRIEF DESCRIPTION OF THE DRAWINGS

The following figures illustrate various aspects of the disclosure.

8b is a graph of the linear improvement factor (defined as the ratio of the PA amplitudes over the initial PA amplitude) versus iteration index.

Figure 9:
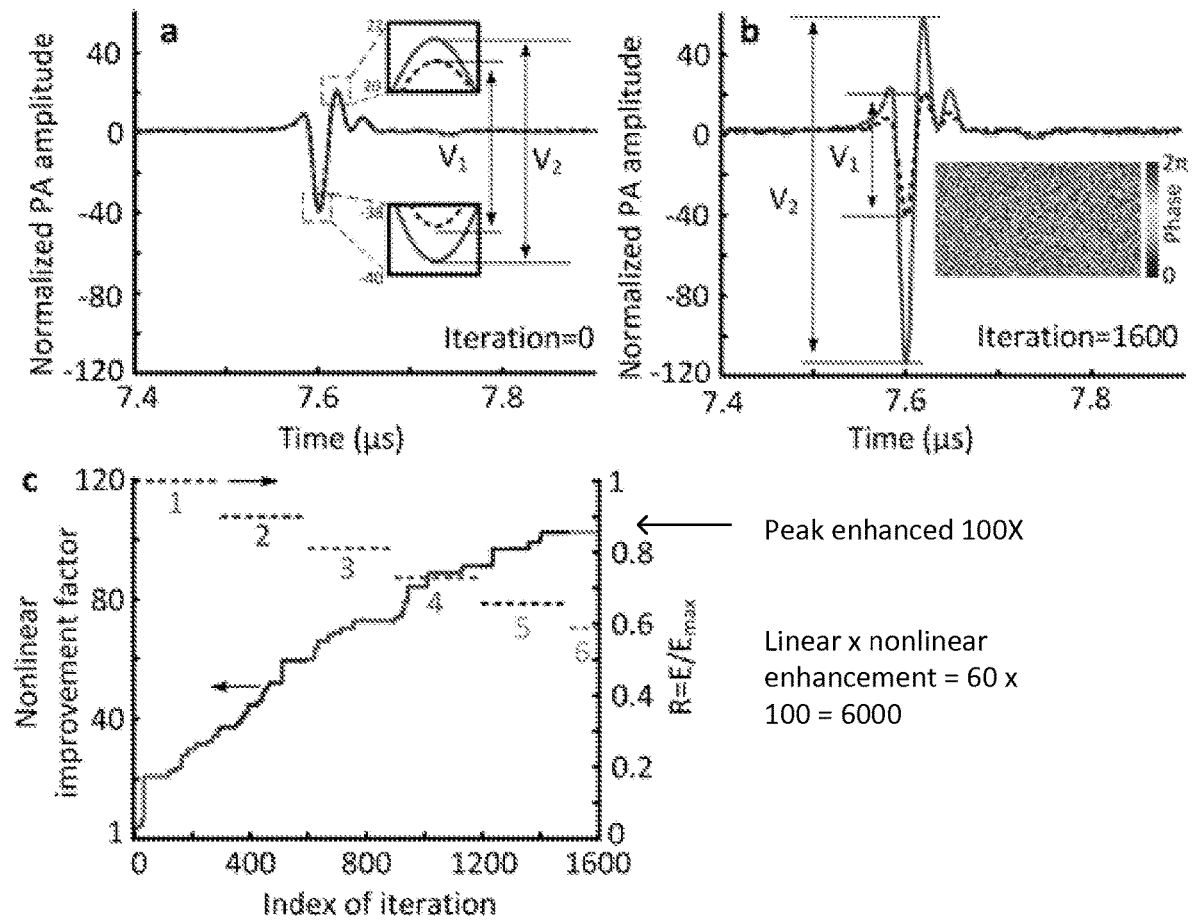

FIG. 9a shows the initial two PA signals (dashed curve for the first, and solid curve for the second) from the paired laser pulses (separated by 40 μs) in Stage 2, when the phase pattern obtained from the linear PAWS procedure was displayed on the SLM. FIG. 9b shows the final two PA signals (dashed curve for the first, and solid curve for the second) after Stage 2 optimization. FIG. 9c is a graph of the nonlinear improvement factor (defined by the ratio between the compensated nonlinear PA amplitudes over the initial value) versus iteration index.

Figure 10:
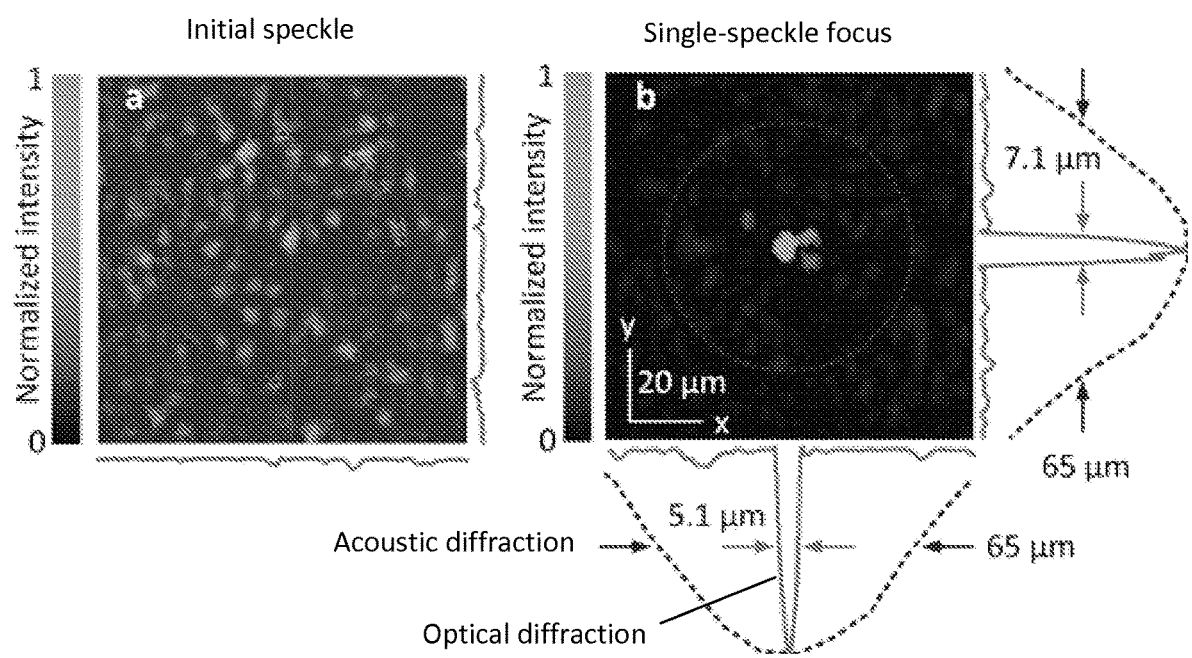

FIG. 10a is a speckle pattern imaged behind a diffuser when a randomized phase pattern was displayed on the SLM. FIG. 10b is the optical focus down to a single speckle grain imaged behind a diffuser when the optimized phase pattern from Stage 2 (the inset of FIG. 9b) was displayed on the SLM.

Figure 11:
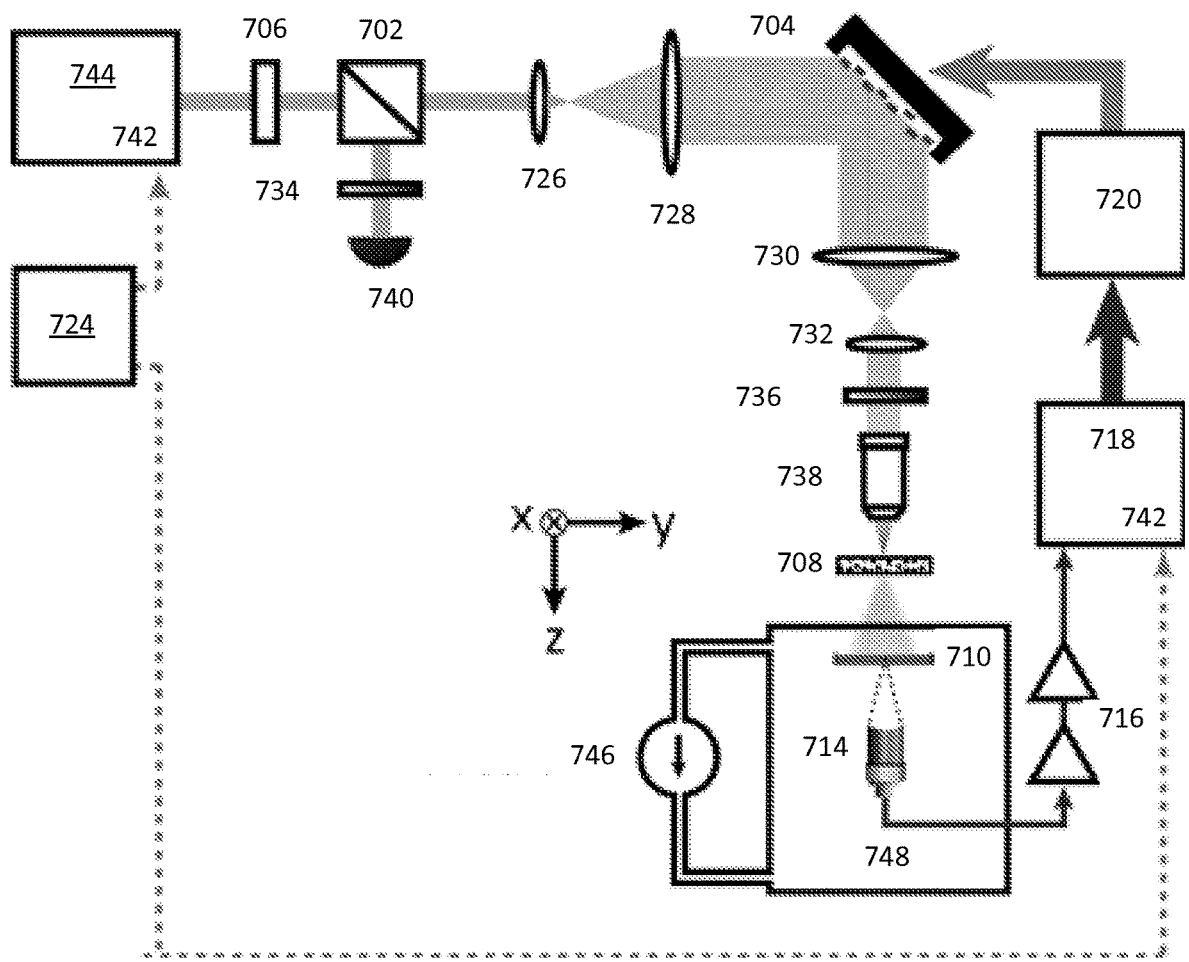

FIG. 11 is a detailed experimental setup diagram illustrating the OR-PAM/GR-PAM system.

Figure 12:
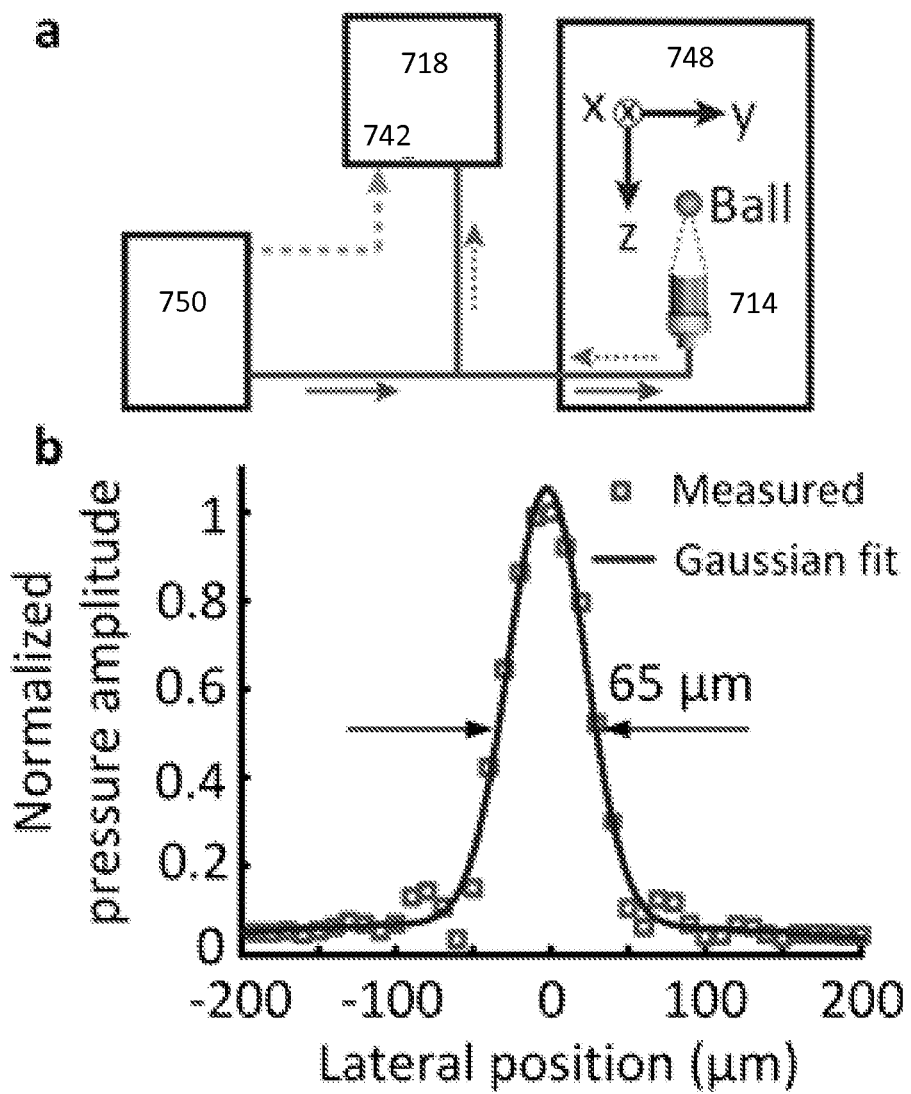

FIG. 12a is a schematic diagram of the experimental setup for transducer calibration. FIG. 12b is a graph of the calibrated acoustic sensitivity at the transducer focal plane, with a FWHM of 65 μm.

Corresponding reference characters and labels indicate corresponding elements among the views of the drawings. The headings used in the figures should not be interpreted to limit the scope of the claims.

DETAILED DESCRIPTION

Provided herein is a Grueneisen-relaxation photoacoustic microscopy (GR-PAM) based on the Grueneisen-relaxation effect, which extends microscopy to imaging a wide variety of non-radiative absorbers with confocal resolution. GR-PAM sequentially excites an absorber with two almost identical laser pulses. The first laser excitation generates a PA signal and thermally tags the absorber. Owing to the Grueneisen-relaxation effect, the second laser excitation produces a stronger PA signal. GR-PAM detects the amplitude difference between the two PA signal, resulting in confocal performance. GR-PAM images pure absorption contrasts and achieves three-dimensional optical resolution. In addition, GR-PAM can effectively suppress the specular emission in conventional PA signals and probe the interior of a relatively large absorber such as a blood vessel. Taking advantage of the new capabilities of GR-PAM, the absolute optical absorption coefficient without fluence calibration may be measured, which enables measurements of the concentrations of many endogenous absorbers.

Scattering of light by wavelength-scale refractive index changes is the reason that media such as paper, frosted glass, fog, and biological tissue appear opaque. The distortion of the optical wavefront propagating within such scattering media makes conventional lens focusing impossible, as the optical wavelets no longer add up in phase at the targeted position. This phenomenon fundamentally limits high-resolution optical imaging techniques, such as microscopy and optical coherence tomography, to depths up to a single transport mean free path (about 1 mm in soft tissue). Invasive procedures, such as embedding optical fibers, are often resorted to when concentrated light is desired beyond this depth, such as in optogenetics and photothermal therapy. When coherent light propagates in a scattering medium, speckles are formed. Despite appearing random, speckles are deterministic within the speckle correlation time. This property has spurred recent advances in optical time-reversal and wavefront-shaping techniques to manipulate the optical wavefront and form a focus within a scattering medium.

Optical time-reversal focusing is achieved by sensing and phase-conjugating the re-emitted wavefront from an internal "guide star" provided by focused ultrasound (TRUE and TROVE) or embedded fluorescent particles. In contrast, wavefront-shaping focusing is achieved by optimizing the incident wavefront to maximize the signal from a guide star. This pattern can be found using iterative algorithms, or by measuring the so-called "transmission matrix". For absorptive targets, photoacoustic (PA) sensing is promising, as the signal comes directly from the target, as well as being non-harmful and non-invasive.

So far, focusing by PA-guided wavefront shaping has produced acoustic diffraction-limited spots. The acoustic diffraction limit may be beat and light may be focused to a single optical speckle grain, reaching the optical diffraction limit. The present disclosure provides for a mechanism to obtain a nonlinear PA signal based on the Grueneisen relaxation effect. Using this nonlinear signal as feedback, PAWS achieves single speckle-grain focusing even when a large number of speckle grains are present within the acoustic focus. A clear optical focus may be obtained on the scale of about 5 to about 7 μm, which is about 10 times smaller than the acoustic focus, with a peak fluence (J/m$^2$) enhancement factor of about 6,000.

I. Grueneisen-Relaxation Photoacoustic Microscopy

Grueneisen-relaxation photoacoustic microscopy (GR-PAM) obtains images using non-radiative absorption with confocal optical resolution. GR-PAM sequentially delivers two identical laser pulses. The first pulse generates a photoacoustic signal and thermally tags the in-focus absorber. Owing to the Grueneisen-relaxation effect, the second pulse generates a stronger photoacoustic signal from the tagged absorber. GR-PAM detects the amplitude difference between the two co-located photoacoustic signals, resulting in confocal imaging of non-radiative absorption. The optical sectioning with about 2.3 μm axial resolution may be improved from about 45 μm by conventional acoustic sectioning, and improved the lateral resolution to about 0.41 μm by a factor of about 1.6. By suppressing specular emission in conventional photoacoustic signals, GR-PAM enables probing the interior of a relative large optical absorber. This set of new capabilities facilitates the measurement of the absolute absorption coefficient without fluence calibration.

GR-PAM may be used for high resolution three-dimensional imaging of absorptive contrasts, such as blood vessel, melanoma cells, cell nuclei, lipid, or any other material or contrast agents that absorb light. Conventional photoacoustic microscopy has only acoustic axial resolution. The disclosed technology will enable optical axial resolution, which can be potentially an order of magnitude finer.

When a short laser pulse excites absorbers under the conditions of both thermal and stress confinements, the initial pressure rise $p_0$ can be written as $$p_0 = \Gamma \eta_{th} \mu_a F, \qquad (1)$$

where $\Gamma$ is the Grueneisen parameter, $\eta_{th}$ is the heat conversion efficiency, $\mu_a$ is the optical absorption coefficient, and F is the optical fluence. The Grueneisen parameter $\Gamma$ depends on the local temperature. When the temperature variation is within a few degrees, the dependence can be estimated as a linear function of temperature.

In GR-PAM, two identical nanosecond laser pulses are sequentially delivered within a sub-microsecond delay. According to Eq. 1, the first pulse generates an initial pressure rise $p_{01}$:

$$p_{01} = \Gamma_0 \eta_{th} \mu_a F, \quad (2)$$

where $\Gamma_0$ is the Grueneisen parameter at the baseline temperature.

The temperature rise at the focus responsible for the initial pressure rise also alters the local Grueneisen parameter within the thermal relaxation time. This phenomenon is the Grueneisen-relaxation effect. Note that the Grueneisen-relaxation time is usually orders-of-magnitude longer than the stress-relaxation time.

Within the Grueneisen-relaxation time, the same absorber may be excited with the second laser pulse, which generates another initial pressure rise $p_{02}$:

$$p_{02} = (\Gamma_0 + b\eta_{th}\mu_a F)\eta_{th}\mu_a F, \quad (3)$$

where b is a coefficient that relates the thermal energy absorbed from the first pulse to the Grueneisen parameter change. Note that b varies with the time delay between the two laser pulses.

If the optical fluence follows 2D Gaussian distributions in the lateral directions, at a certain axial position, the fluence can be written as $$F(x, y) = \frac{E}{\pi w^2} \exp\left(-\frac{x^2 + y^2}{w^2}\right), \quad (4)$$

where E is the pulse energy at the absorber plane, x and y are the coordinates in the lateral directions, and w is the dimension of the waist of the Gaussian beam at the current axial position.

Because the optical focal spot is well confined within the acoustic voxel, the detected PA amplitude is proportional to the total initial pressure rise in an acoustic detection voxel. Therefore, the PA amplitude induced by the first laser pulse can be derived from the spatial integration of $p_{01}$:

$$PA_1 = k\Gamma_0\eta_{th} E \int\int \mu_a(x, y) \frac{1}{\pi w^2} \exp\left(-\frac{x^2 + y^2}{w^2}\right) dxdy, \quad (5)$$

where k is a constant related to the PA detection sensitivity.

Similarly, the PA amplitude induced by the second laser pulse can be written as $$PA_2 = k\Gamma_0\eta_{th} E \int\int \mu_a(x, y) \frac{1}{\pi w^2} \exp\left(-\frac{x^2 + y^2}{w^2}\right) dxdy + \\ k b \eta_{th}^2 E^2 \int\int \mu_a^2(x, y) \frac{1}{\pi^2 w^4} \exp\left(-\frac{x^2 + y^2}{w^2/2}\right) dxdy. \quad (6)$$

The right-hand side of Eq. 6 has two parts. The first part is the same as $PA_1$. The second part is generated from the joint effect of the first pulse's Grueneisen relaxation and the second pulse's excitation.

Subtracting Eq. 5 from Eq. 6 obtains the differential signal between $PA_2$ and $PA_1$, called the GR-PA signal:

$$\Delta PA = PA_2 - PA_1 = kb\eta_{th}^2 E^2 \int\int \mu_a^2(x, y) \frac{1}{\pi^2 w^4} \exp\left(-\frac{x^2 + y^2}{w^2/2}\right) dxdy. \quad (7)$$

For a planar target with a constant $\mu_a$, the GR-PA signal becomes $$\Delta PA = kb\eta_{th}^2 \mu_a^2 E^2 \frac{1}{2\pi w^2}. \quad (8)$$

The Gaussian beam waist varies with the distance z from the focus in a relationship of $$w^2 = w_0^2(1 + z^2/z_R^2), \quad (9)$$

where $w_0$ is the beam waist at the focus, and $z_R$ is the Rayleigh range. When $z = \pm z_R$, the GR-PA signal amplitude decreases by half of that when the beam is focused at the absorber plane. Hence the axial full width at half maximum (FWHM) of a planar target is twice the optical Rayleigh range, giving GR-PAM optical sectioning capability.

In comparison, the OR-PAM signal amplitude from a planar target is $$PA_1 = k\Gamma_0\eta_{th}\mu_a E. \quad (10)$$

Since none of the parameters on the right-hand side of Eq. 10 change with the focal distance, conventional OR-PAM cannot provide optical sectioning for planar targets.

The lateral resolution of GR-PAM is estimated from a point target. When scanning the point target in the x-y plane, GR-PAM generates a two-dimensional image, expressed by $$\Delta PA(x, y) = kb\eta_{th}^2\mu_a^2 E^2 \frac{1}{\pi^2 w^4} \exp\left(-\frac{x^2 + y^2}{w^2/2}\right). \quad (11)$$

The point spread function of the GR-PAM follows a Gaussian distribution with a waist of $w/\sqrt{2}$.

In comparison, OR-PAM gives an image described by $$PA_1(x, y) = k\Gamma_0\eta_{th}\mu_a E \frac{1}{\pi w^2} \exp\left(-\frac{x^2 + y^2}{w^2}\right). \quad (12)$$

The point spread function of OR-PAM follows a Gaussian distribution with a waist dimension of w. Therefore, the lateral resolution of GR-PAM is better than that of OR-PAM by a factor of $\sqrt{2}$.

GR-PAM is analogous to conventional confocal microscopy. In GR-PAM, the first laser pulse thermally tags absorbers. Since the fluence in the optical focus zone is much higher than that out of the focal zone, only absorbers within the focal zone can be effectively tagged. The second laser pulse excites the same absorbers. The Grueneisen-relaxation effect allows the two temporally separated but spatially co-located laser pulses to jointly act on the same absorbers and produce an increased signal. The differential operation rejects the non-tagged PA signals, analogous to the pinhole in optical confocal microscopy. Typical optical fluence distributions, the residual temperature rise, and a differential pressure distribution are illustrated in FIG. 1a, FIG. 1b and FIG. 1c.

Figure 1:
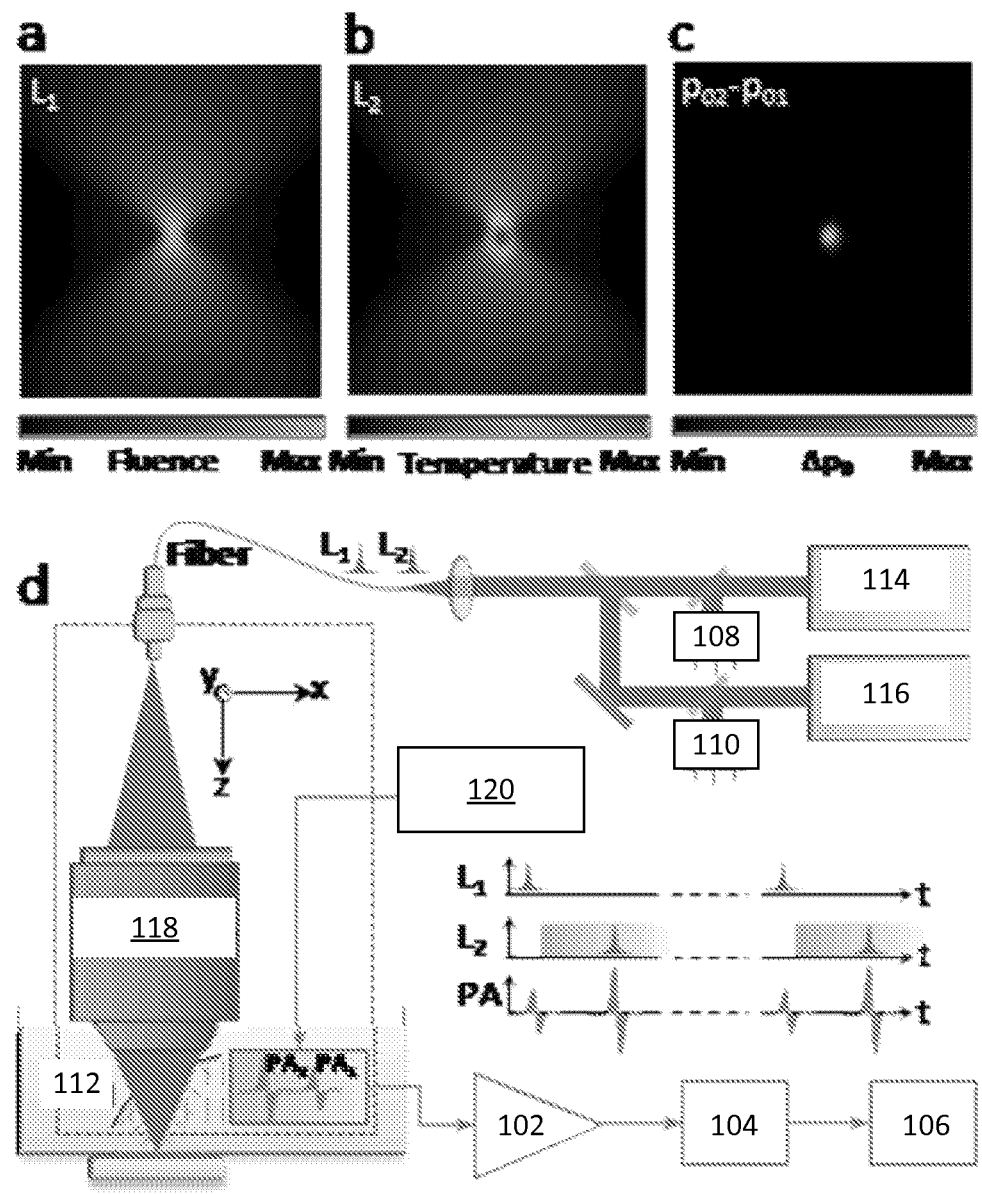
FIG. 1a is a fluence distribution for laser pulse 1 ($L_1$).
FIG. 1b shows a residual temperature rise from laser pulse 1 and fluence distribution of laser pulse 2 ($L_2$).
FIG. 1c shows a differential pressure rise induced by the Grueneisen-relaxation effect.
FIG. 1d is a schematic of a GR-PAM system.

FIG. 1d is a schematic of a GR-PAM system. In an aspect, the GR-PAM system may include an amplifier 102, a high-speed digitizer 104; a computer 106; photodiodes 1 and 2 108, 110; and a parabolic mirror 112. In an aspect, the amplifier may be an about 40-dB broadband amplifier. In another aspect, $p_{01}$ may be the initial pressure from the first laser pulse, $p_{02}$ may be the initial pressure from the second laser pulse, and $\Delta p_0 = p_{02} - p_{01}$. Two identical pulsed lasers 114, 116 may be sequentially triggered with a sub-microsecond delay. In an aspect, the lasers may have an about 532 nm wavelength, about 1 ns pulse duration, and a SPOT of about 100-200-532. A subpanel in FIG. 1d shows the temporal relationship among the laser triggers and the PA signals. The laser energy is calibrated by two photodiodes. The two laser beams are spatially aligned and coupled into a single-mode fiber connected to a PA probe. The PA probe may employ an objective 118 to focus the laser beam. In an aspect, the objective may be a 0.63 numerical aperture (NA) objective, where 0.63 NA is the highest for reflection-mode OR-PAM. A parabolic mirror 112 with a center opening may transmit light and reflect the ultrasonic wave to a custom-made ultrasound transducer 120. The optical objective and the parabolic mirror may focus to the same spot to optimize the PA detection sensitivity. In an aspect, the output of the ultrasound transducer may be amplified by 40 dB, digitized at 500 MHz, and recorded in a PC. At each position, two PA signals are recorded. The PC and a FPGA card may control a three-axis motorized to perform three-dimensional scanning.

In an aspect, a method of Grueneisen-relaxation photoacoustic microscopy (GR-PAM) of a subject may include delivering a first laser pulse to a focus region; detecting a first photoacoustic signal induced by illumination of the focus region by the first laser pulse; after a lag interval time after the delivery of the first laser pulse, delivering a second laser pulse to the focus region; detecting a second photoacoustic signal induced by illumination of the focus region by the second laser pulse; and subtracting a first peak-to-peak magnitude of the first photoacoustic signal from a second peak-to-peak magnitude of the second photoacoustic signal to obtain a GR-PA signal corresponding to the focus region.

In an aspect, the lag interval time may be less than a thermal relaxation time of the subject. In another aspect, the lag interval time may range from less than about 0.1 µs to less than about 50 µs. In various aspects, the lag interval time may range from less than about 0.1 µs to less than about 0.5 µs, from less than about 0.3 µs to less than about 1 µs, from less than about 0.5 µs to less than about 2 µs, from less than about 1 µs to less than about 5 µs, from less than about 2 µs to less than about 10 µs, from less than about 5 µs to less than about 15 µs, from less than about 10 µs to less than about 20 µs, from less than about 15 µs to less than about 25 µs, from less than about 20 µs to less than about 30 µs, from less than about 25 µs to less than about 35 µs, from less than about 30 µs to less than about 40 µs, from less than about 35 µs to less than about 45 µs, and from less than about 40 µs to less than about 50 µs. In one aspect, the lag interval time may be 0.5 µs.

The first laser pulse may heat the focus region from a first temperature to a second temperature, where the first temperature and the second temperature are both within a linear temperature range at which the Grueneisen parameter varies linearly with respect to temperature. In an aspect, the linear temperature range may range from about 10° C. to about 55° C. for a biological tissue comprising water, fatty tissues, or any combination thereof. In various aspects, the linear temperature range may range from about 10° C. to about 20° C., from about 15° C. to about 25° C., from about 20° C. to about 30° C., from about 35° C. to about 45° C., from about 40° C. to about 50° C., and from about 45° C. to about 55° C. In an aspect, the second temperature may be no more than about 5° C. higher than the first temperature.

The first laser pulse and the second laser pulse may each include a pulse width of less than about 5 ns to less than about 20 ns. In various aspects, the pulse width may range from about 5 ns to about 7 ns, from about 6 ns to about 8 ns, from about 7 ns to about 9 ns, from about 8 ns to about 10 ns, from about 10 ns to about 15 ns, from about 12 ns to about 17 ns, and from about 15 ns to about 20 ns. In one aspect, the pulse width may be 10 ns.

The first laser pulse includes a first laser pulse energy and the second laser pulse includes a second laser pulse energy that is essentially equal to the first laser pulse energy. The second laser pulse energy ranges from about 1% to about 100% of the first laser pulse energy. In various aspects, the second laser pulse energy may range from about 1% to about 20%, from about 10% to about 30%, from about 20% to about 40%, from about 30% to about 50%, from about 40% to about 60%, from about 50% to about 70%, from about 60% to about 80%, from about 70% to about 90%, and from about 80% to about 100% of the first laser pulse energy. The first laser pulse and the second laser pulse may further include a pulse wavelength ranging from about 400 nm to about 1300 nm. In various aspects, the first and second laser pulses may have a wavelength ranging from about 400 nm to about 600 nm, from about 500 nm to about 700 nm, from about 600 nm to about 800 nm, from about 700 nm to about 900 nm, from about 800 nm to about 1000 nm, from about 900 nm to about 1100 nm, from about 1000 nm to about 1200 nm, and from about 1100 to about 1300 nm.

The lateral resolution of the GR-PAM may be about $1/\sqrt{2}$ times the lateral resolution of OR-PAM performed using similar process parameters. In an aspect, the lateral resolution of the GR-PAM may be less than about 0.5 µm. In another aspect, the axial resolution of the GR-PAM may be at least 10 times finer than the axial resolution of OR-PAM performed using similar process parameters. In one aspect, the axial resolution of the GR-PAM may be less than about 5 µm. The GR-PAM may perform optical sectioning, where an axial FWHM of the GR-PA signal obtained from a planar target may be about twice the Rayleigh range of a light beam comprising the first laser pulse and the second laser pulse.

In another aspect, a method of obtaining an absorption coefficient of a sample using Grueneisen-relaxation photoacoustic microscopy (GR-PAM) may include obtaining a plurality of GR-PA signals, each GR-PA signal obtained at a focus region situated at a different penetration depth z within the sample; fitting the plurality of GR-PA signals and associated penetration depths z to a first equation to determine an optical absorption coefficient:

$$\Delta PA(z) = Ae^{-(2\mu_a z)}; \quad (13)$$

where $\Delta PA(z)$ is the GR-PA signal at the penetration depth z and A is an amplitude corresponding to the GR-PA signal measured at z=0; and calculating the optical absorption coefficient from the fitted first equation.

Each GR-PA signal at each penetration depth z may be obtained by delivering a first laser pulse to the focus region at the penetration depth z; detecting a first photoacoustic signal induced by illumination of the focus region by the first laser pulse; after a lag interval time after the delivery of the first laser pulse, delivering a second laser pulse to the focus region; detecting a second photoacoustic signal induced by illumination of the focus region by the second laser pulse; and subtracting a first peak-to-peak magnitude of the first photoacoustic signal from a second peak-to-peak magnitude of the second photoacoustic signal to obtain each GR-PA signal. The method may further include determining the concentration of a plurality of molecules in the sample using the obtained absorption coefficient. In an aspect, the plurality of molecules may include a known molar extinction spectrum. The plurality of molecules may include but is not limited to oxy-hemoglobin or deoxy-hemoglobin.

Non-radiative relaxation is a primary energy conversion mechanism. The Grueneisen-relaxation effect, as a natural result of non-radiative relaxation, exists in most light-matter interactions. A photoacoustic signal is inherently sensitive to local Grueneisen parameter. The combination of the Grueneisen-relaxation effect and photoacoustic detection enables high-resolution label-free imaging of many endogenous absorbers, such as hemoglobin, lipid, melanin, DNA/RNA, protein, or water. Although the specificity of single-wavelength label-free imaging might not be as high as a fluorescence-labeled counterpart, multiple wavelengths may be used to spectrally separate primary absorbers. Functional parameters associated with these absorbers, e.g., the oxygen saturation of blood, can be mapped in 3D with high resolution.

GR-PAM requires a pulse energy similar to that of conventional OR-PAM. Since the differential PA signal amplitude is proportional to the residual temperature, a good PA signal from the first laser pulse ensures effective thermal tagging. However, the differential operation in GR-PAM decreases the signal-to-noise ratio (SNR). Modulated thermal tagging may be used to improve SNR. Averaging or more sensitive ultrasound detection may improve SNR in one aspect. In terms of light exposure, the average laser power of GR-PAM may be twice as high as that in OR-PAM due to the second laser pulse. If cumulative heating starts to approach the damage threshold, the laser pulse energy can be reduced at the expense of SNR. Unlike conventional OR-PAM, the GR-PAM signal is proportional to the square of the optical absorption coefficient. Thus the square root of the GR-PA signal may be used if a linear mapping of the absorption coefficient is desired.

Using a dual-pulse laser system and a high-NA PA probe, GR-PAM improves the axial resolution from the acoustic scale to the optical focal depth, and the lateral resolution was improved by $\sim\sqrt{2}$. The dual-laser system can be further simplified by splitting a single laser beam into two and delaying one of them. The point-by-point depth scanning prolongs data acquisition, which might be mitigated by increasing the laser repetition rate and the scanning speed.

Besides its improved resolution, GR-PAM enables probing the interior properties of a relatively large absorber. While specular emission limits conventional PA detection to the surface of the absorber, GR-PAM thermally tags inner parts of the absorber and suppresses the specular emission. Via scanning the focus, the signal decay constant can be measured to quantify the absolute absorption coefficient without fluence calibration. The absorption contrast, the three-dimensional optical resolution, and the unique capability to probe the interior of absorbers may extend microscopy to broader applications.

II. Nonlinear Photoacoustic Wavefront Shaping (PAWS) for Single Speckle-Grain Optical Focusing in Scattering Media Non-invasively focusing light into strongly scattering media, such as biological tissue, is highly desirable but challenging. Recently, wavefront-shaping technologies guided by ultrasonic encoding or photoacoustic sensing have been developed to address this limitation. So far, these methods provide only acoustic diffraction-limited optical focusing. Here, nonlinear photoacoustic wavefront shaping (PAWS) achieves optical diffraction-limited (i.e., single-speckle-grain sized) focusing in scattering media. A dual-pulse excitation approach generates nonlinear photoacoustic (PA) signals based on the Grueneisen relaxation effect. These nonlinear PA signals may be used as feedback to guide iterative wavefront optimization. By maximizing the amplitude of the nonlinear PA signal, light is effectively focused to a single optical speckle grain within the acoustic focus. A clear optical focus may be on the scale of about 5 to about 7 µm, which is about 10 times smaller than the acoustic focus, with an enhancement factor of about 6,000 in peak fluence.

Figure 7:
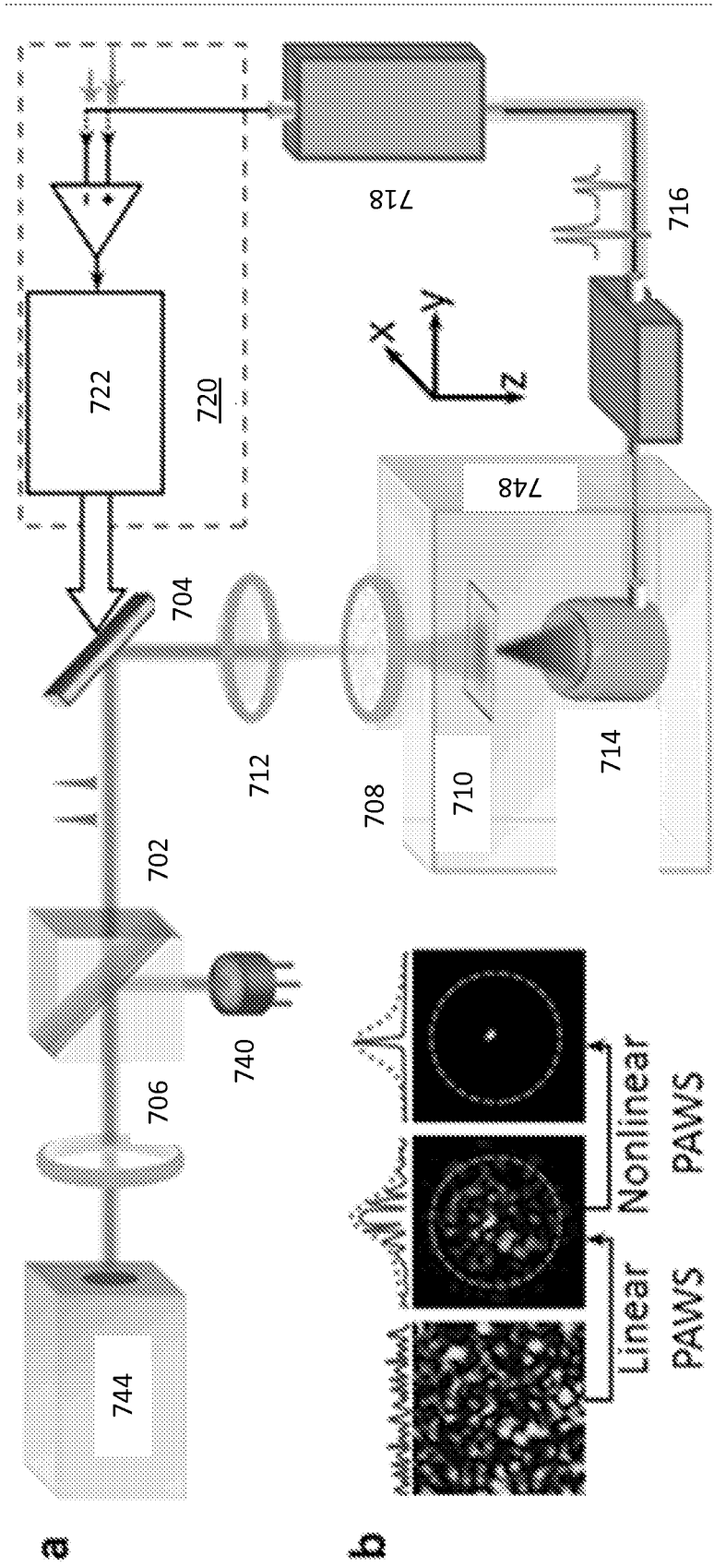
FIG. 7a is a schematic of the photoacoustic wavefront shaping (PAWS) experimental setup.
FIG. 7b is an illustration of the two-stage optimization procedure.

The PAWS system setup is illustrated schematically in FIG. 7a in an aspect. The system may include a polarized beam splitter (PBS) 702, a spatial light modulator (SLM) 704, a half-wave plate ($\lambda/2$) 706. The scattering medium consists of a ground glass diffuser 708 and a layer of optically absorbing whole blood 710. The incident light reflected from the SLM surface may be scattered by a diffuser 708, generating a random speckle pattern with about 5-µm speckle grains on the blood layer 710. The system may further include a lens 712, an ultrasonic transducer 714, an amplifier 716, an oscilloscope 718, and a computer 720 with a genetic algorithm 722. The whole blood 710 and the ultrasound transducer 714 may be within water 724.

In an aspect, a method of focusing a light pulse within a focus area using nonlinear photoacoustic wavefront shaping (PAWS) may include obtaining an initial GR-PA feedback signal using an initial wavefront from within the focus area; obtaining at least one subsequent GR-PA feedback signal; selecting an optimized wavefront according to an optimization criterion; and focusing the light pulse comprising the optimized wavefront within the focus area at a single-speckle resolution. Each subsequent GR-PA feedback signal may be obtained using a subsequent wavefront determined by altering a preceding wavefront according to a wavefront optimization rule using an immediately preceding GR-PA feedback signal obtained using the preceding wavefront In an aspect, a GR-PA signal may be obtained by: delivering a first laser pulse comprising one wavefront to the focus area; detecting a first photoacoustic signal induced by illumination of the focus area by the first laser pulse; delivering a second laser pulse comprising the one wavefront to the focus area at a lag interval time after the delivery of the first laser pulse; detecting a second photoacoustic signal induced by illumination of the focus area by the second laser pulse; and subtracting a first peak-to-peak amplitude of the first photoacoustic signal from a second peak-to-peak amplitude of the second photoacoustic signal to obtain the GR-PA signal. Each subsequent wavefront may produce a subsequent GR-PA signal higher than any preceding GR-PA signal. In an aspect, the wavefront optimization rule may include a genetic algorithm. The optimization criterion may include, but is not limited to the optimized wavefront is the wavefront determined after a maximum number of GR-PA signals have been obtained; the optimized wavefront is the wavefront for which a difference a GR-PA signal associated with the optimized wavefront and the immediately preceding GR-PA signal is less than a minimum GR-PA signal difference; and the optimized wavefront produces a GR-PA signal greater than a minimum threshold GR-PA signal.

In an aspect, the maximum number of GR-PA signals ranges from about 100 to about 2000. In various aspects, the maximum number of GR-PA signals may range from about 100 to about 500, from about 250 to about 750, from about 500 to about 1000, from about 750 to about 1250, from about 1000 to about 1500, from about 1250 to about 1750, and from about 1500 to about 2000. In an aspect, the optimized wavefront may be obtained in an optimization time less than a speckle decorrelation time. The first laser pulse and the second laser pulse may include a laser fluence, where the laser fluence may be decreased between obtaining one or more subsequent feedback signals to avoid overheating the sample. The lag interval time may be less than about 0.1 µs to less than about 50 µs. In various aspects, the lag interval time may range from less than about 0.1 µs to less than about 0.5 µs, from less than about 0.3 µs to less than about 1 µs, from less than about 0.5 µs to less than about 2 µs, from less than about 1 µs to less than about 5 µs, from less than about 2 µs to less than about 10 µs, from less than about 5 µs to less than about 15 µs, from less than about 10 µs to less than about 20 µs, from less than about 15 µs to less than about 25 µs, from less than about 20 µs to less than about 30 µs, from less than about 25 µs to less than about 35 µs, from less than about 30 µs to less than about 40 µs, from less than about 35 µs to less than about 45 µs, and from less than about 40 µs to less than about 50 µs. In one aspect, the lag interval time may be 20 µs.

Each wavefront may include a spatial phase pattern generated by delivering a laser pulse through a configurable spatial light modulator. In an aspect, the initial wavefront may be chosen from a random spatial phase pattern and an optimal spatial phase pattern obtained by a linear photoacoustic wavefront shaping method. The linear photoacoustic wavefront shaping method may include a time-reversed ultrasonically encoded (TRUE) optical focusing method. In an aspect, the optimized GR-PA signal obtained using the optimized waveform may be at least 100 times greater than the initial GR-PA signal.

In an aspect, the focus region of the GR-PA signal may include a lateral resolution corresponding to a single speckle. The focus region of the GR-PA signal may include a lateral resolution of less than about 10 µm. In various aspects, the lateral resolution may range from less than about 0.5 µm to less than about 2 µm, from less than about 1 µm to less than about 5 µm, from less than about 3 µm to less than about 6 µm, from less than about 5 µm to less than about 8 µm, and from less than about 7 µm to less than about 10 µm. The focus region of the GR-PA signal may be centered within an acoustic focus region of an acoustic transducer used to obtain photoacoustic signals.

In an aspect, the method may further include centering the focus region within the acoustic focus region by obtaining a plurality of scanned PA signals using the optimized wavefront scanned across the acoustic focus region at a plurality of scan locations and using the scan location associated with the highest PA signal of the plurality of scanned PA signals to center the focus region within the acoustic focus region. The optimized wavefront may be scanned across the acoustic focus region by applying a linear phase ramp to an optimized spatial phase pattern associated with the optimized wavefront. In an aspect, a high-fluence laser pulse including the optimized waveform may be delivered to the focus region to perform a laser microsurgery. The laser microsurgery may include a photocoagulation of small blood vessels, a photoablation of tissue, and any combination thereof.

The PA effect describes the formation of acoustic waves due to absorption of light, which is usually short-pulsed. The PA amplitude is proportional to the product of the absorbed optical energy density and the local Grueneisen parameter. It is well known that the Grueneisen parameters of many materials are highly temperature dependent. For example, from about 20° C. to about 40° C., the Grueneisen parameter of water or diluted aqueous solutions may increase by about 96%. Within the thermal confinement time, the temperature rise due to the absorption of light lingers and changes the local Grueneisen parameter accordingly, which is referred to as the Grueneisen relaxation effect.

Figure 6:
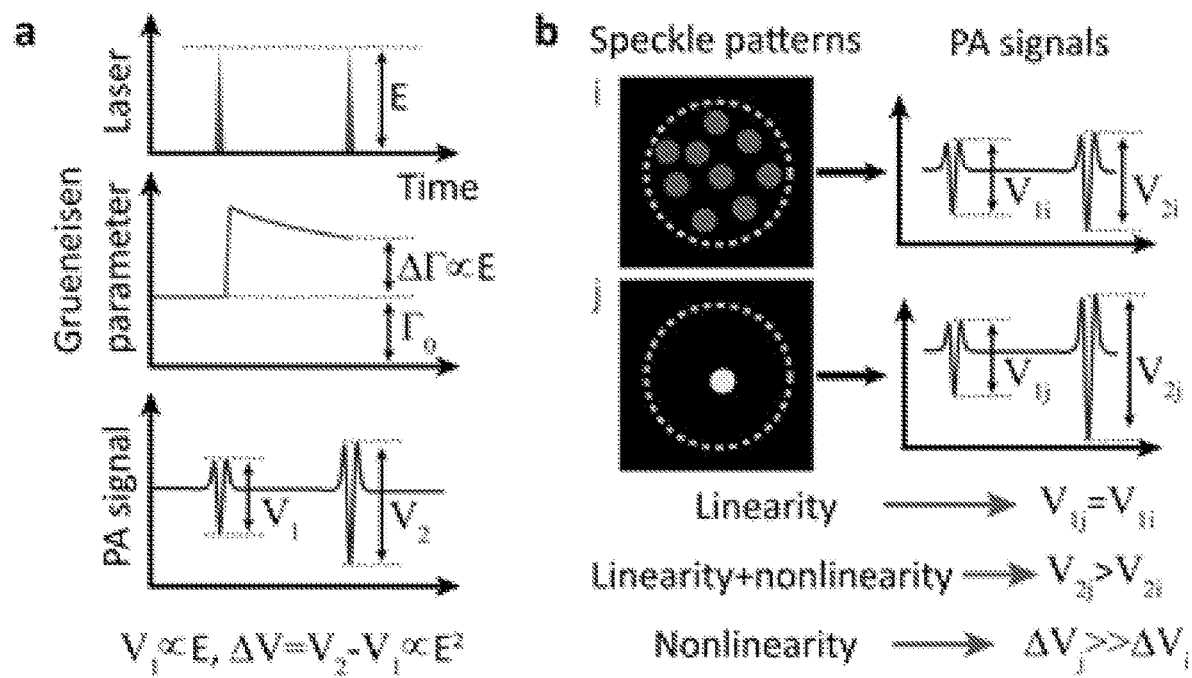
FIG. 6a is a schematic illustration of the Grueneisen relaxation effect producing a nonlinear photoacoustic signal.
FIG. 6b is an schematic illustration of the nonlinear PAWS principle.

A dual-pulse excitation approach is used to obtain a nonlinear PA signal based on the Grueneisen relaxation effect. As shown in FIG. 6a, two identical laser pulses are fired sequentially to excite the same absorber. Two laser pulses with equal energy E are incident on an optical absorber. The first pulse causes a sustained change in the Grueneisen parameter—referred to as the Grueneisen relaxation effect—due to an increase in temperature. Within the thermal confinement time, the change in the Grueneisen parameter $\Delta\Gamma$ causes the amplitude from the second PA signal ($V_2$) to be stronger than that from the first ($V_1$). The difference between the peak-to-peak amplitudes $\Delta V$ is nonlinear—proportional to the square of the laser pulse energy. At the first laser pulse, the Grueneisen parameter is determined by the initial temperature. At the second laser pulse, the Grueneisen parameter is changed (usually increased) due to the Grueneisen relaxation effect. Therefore, the second PA signal has a different amplitude from the first one. If the PA amplitude is assumed to be proportional to the laser energy and the Grueneisen parameter is assumed to be linearly dependent on the local temperature, the amplitude difference between the two PA signals is proportional to the square of the laser energy (or fluence). A detailed derivation is shown as follows.

The peak-to-peak amplitude of the first PA signal is given by the following integral:

$$V_1 = k \iint A(x, y) \Gamma_0 \mu_a F(x, y) dx dy, \quad (16)$$

where k is a constant coefficient, $A(x, y)$ is the normalized acoustic detection sensitivity, $\Gamma_0$ is the Grueneisen parameter at the initial temperature $T_0$, $\mu_a$ is the material absorption coefficient, and $F(x, y)$ is the optical fluence distribution. As defined herein below, all PA amplitudes refer to peak-to-peak values. Within the acoustic resolution voxel, both $\Gamma_0$ and $\mu_a$ are assumed to be uniform and constant, and the integration along the z-axis direction is taken into account in the constant coefficient k. $A(x, y)$ is frequently approximated using a Gaussian function, $$A(x, y) = \frac{1}{2\pi\sigma^2} \exp\left(-\frac{x^2 + y^2}{2\sigma^2}\right),$$

where $2\sqrt{\ln 2}\sigma$ is the full width at half maximum (FWHM) of the one-way transducer response.

The Grueneisen parameter immediately before the second laser pulse can be approximated as $$\Gamma = \Gamma_0 + \eta \Gamma_0' \mu_a F, \quad (17)$$

where $\eta$ is a constant coefficient that converts absorbed optical energy density into temperature rise, and $\Gamma_0'$ is the first-order derivative of the Grueneisen parameter with respect to temperature at $T_0$. Therefore, the amplitude of the second PA signal is $$V_2 = k \iint A(x, y)[\Gamma_0 + \eta \Gamma_0' \mu_a F(x, y)] \mu_a F(x, y) dx dy. \quad (18)$$

The amplitude difference between the two PA signals is $$\Delta V = V_2 - V_1 = k \eta \Gamma_0' \mu_a^2 \iint A(x, y) F^2(x, y) dx dy. \quad (19)$$

This amplitude difference ΔV is proportional to the square of the optical fluence, thus termed the nonlinear PA amplitude.

When the amplitude from a single PA signal is used as feedback to iterative wavefront shaping (linear PAWS), optical energy is concentrated into the acoustic focus. To focus light to the optical diffraction limit, the nonlinear PA amplitude ΔV can be used as feedback (nonlinear PAWS). The reason for the narrower optical focus can be explained by rewriting equation (19) as $$\Delta V = k\eta \Gamma_0' \mu_a^2 (\overline{F}^2 + F_{Var}), \quad (20)$$

where $\overline{F} = \iint A(x,y) F(x,y) dxdy$ and $F_{Var} = \iint A(x,y)[F(x,y) - \overline{F}]^2 dxdy$ can be treated as the mean and variance of $F(x,y)$, with a probability density function of $A(x,y)$. Since both $\overline{F}^2$ and $F_{Var}$ are non-negative, ΔV is maximized when both $\overline{F}^2$ and $F_{Var}$ are maximized. $\overline{F}^2$ is proportional to $V_1^2$ and therefore reaches its maximum when light is concentrated within the acoustic focus. Maximizing $F_{Var}$ is the same as maximizing the uniqueness of $F(x,y)$. Therefore, if the total optical energy is constrained, $F_{Var}$ is maximized when all the optical energy is focused to a single speckle grain with nonlinear PAWS.

FIG. 6b further explains why nonlinear PAWS can focus light to a single speckle grain using an idealized example. When the same optical energy is concentrated to fewer speckle grains within an ultrasound focus, linear PA amplitude does not increase significantly, but nonlinear PA amplitude approximately increases inversely proportionally with the number of bright speckle grains. Therefore, by maximizing ΔV, light can be focused as tightly as the optical diffraction limit (i.e., one speckle grain). The blue dashed circles represent the ultrasonic focal region. The ultrasonic detection sensitivity may be simplified to be relatively uniform within a circular focal area, and assumed that the total light energy is constant and evenly distributed among the speckle grains within the ultrasonic focus. Consider two different speckle patterns i and j: speckle pattern i has multiple speckle grains within the ultrasonic focus; speckle pattern j has only one speckle grain. In speckle pattern i, linear PAWS maximizes total energy inside acoustic focus, and in speckle pattern j, nonlinear PAWS maximizes peak energy density inside acoustic focus. In these two cases, the two linear PA amplitudes $V_{1i}$ and $V_{1j}$ are the same, but the two nonlinear PA amplitudes $\Delta V_i$ and $\Delta V_j$ are significantly different. Compared with speckle pattern i, speckle pattern j concentrates light onto a smaller area and thus causes a higher temperature rise, resulting in a stronger nonlinear PA signal. If all speckle grains have the same area, from equation (19), the nonlinear PA amplitude can be simplified as $$\Delta V = \frac{1}{M} k\eta \Gamma_0' \mu_a^2 A_0 \frac{E^2}{s^2}, \quad (21)$$

where M is the number of speckle grains within the acoustic focus, $A_0$ is the constant acoustic detection sensitivity, E is the total pulse energy, and s is the area of one speckle grain. Equation (21) shows that the nonlinear PA amplitude ΔV increases inversely with M, and is maximized when M=1 (optical diffraction-limited focusing). The fluence $$\left(\frac{E}{Ms}\right)$$

is also inversely proportional to M. Thus the nonlinear PA amplitude is proportional to the fluence at constant incident laser energy. Although this conclusion is based on idealized assumptions, it is helpful for estimating the order of magnitude of the peak fluence.

To date, optical focusing using PA-guided wavefront shaping has been limited by acoustic diffraction when extended absorbers are targeted. To break through the acoustic resolution limit, nonlinear PAWS has been proposed and demonstrated. Using dual-pulse excitation, nonlinear PA signals were generated based on the Grueneisen relaxation effect. By maximizing the nonlinear PA amplitude, diffused light was able to be focused into a single optical mode. The focus may be about 5.1 μm×about 7.1 μm laterally, about an order of magnitude smaller than the acoustic focal size in each dimension. Note that, about 169 speckle grains exist within the acoustic focal region (determined by taking the ratio between the area of the acoustic focus and the area of a single speckle grain), but after nonlinear PAWS, only one was dominant within the final optical focus. While the absorber may be positioned behind a ground glass diffuser, the same principles may be applied when focusing to absorbers within scattering media, as long as the media are transparent to ultrasound.

The peak fluence enhancement was estimated to be about 6000 times (about 60 times from the linear PAWS stage and about 100 times from the nonlinear PAWS stage). The peak fluence enhancement can also be estimated from the temperature rise. At the end the nonlinear PAWS, the second PA amplitude $V_2$ was about 168% greater than the first PA amplitude $V_1$, which was measured at room temperature of about 20° C. (FIG. 9b). Assuming that the Grueneisen parameter is proportional to the temperature rise, the corresponding temperature rise is estimated to be about 34° C. From here, the final fluence F is predicted as $$F = \frac{\Delta T \rho C_V}{\mu_a} = \frac{34 K \times 1 \text{ g} \cdot \text{cm}^{-3} \times 4000 \text{ mJ} \cdot \text{g}^{-1} \cdot K^{-1}}{240 \text{ cm}^{-1}} = 567 \text{ mJ} \cdot \text{cm}^{-2}, \quad (22)$$

where ρ is the mass density of blood, $C_V$ is the heat capacitance of blood, and $\mu_a$ is the absorption coefficient of blood. Compared to the initial fluence of about 0.1 mJ·cm$^{-2}$, the final peak fluence is increased by about 5670 times, which agrees with the aforementioned estimation of about 6000 times.

To date, there has been only one other demonstration of noninvasive speckle-scale optical focusing inside scattering media, by using time reversal of variance-encoded light (TROVE). In TROVE, the scattered light from the scattering medium is recorded at four different positions, and a focused ultrasound beam is used to define the target region. Speckle-scale focusing is then obtained by computing the appropriate phase map from the measured speckle fields. Despite achieving similar goals, TROVE and nonlinear PAWS are complementary: TROVE time-reverses ultrasonically encoded light, and is therefore more applicable for non- or low-absorption targets. In comparison, nonlinear PAWS is preferred in applications with absorptive targets, such as blood vessels or melanomas in biological tissue. Furthermore, the peak enhancement reported in TROVE is about 110-fold, whereas, PAWS demonstrated an unprecedented peak enhancement of about 6,000-fold, which is a significant advantage in many applications, such as photothermal therapy or optogenetic excitation, that desire intense focusing.

In an aspect, the optimization speed may be increased. Linear and nonlinear PAWS may take several hours in total. To maintain the deterministic property of the scattering medium, the PAWS focusing procedure must be completed within the speckle correlation time, which is on the order of one millisecond for in vivo tissue. Although the SLM operates at 60 Hz, it may take about 1.2 s for the SLM display to fully stabilize. Due to this long optimization time, stable diffusers may be used. In various aspects, faster devices may be used to improve the speed of optimization. For example, digital mirror devices with switching times of about 22 μs have been used in wavefront shaping, and may shorten the optimization. The speed may also affect the choice in the number of controlled blocks used on the SLM. On one hand, the optimization time with the genetic algorithm scales linearly with the number of blocks. On the other hand, the potential peak enhancement also increases linearly. In an aspect, about 192×108 may be used as a practical compromise.

The generation of nonlinear PA signal requires only a reasonable temperature rise. An initial fluence of about 6 mJ·cm$^{-2}$ may be used for nonlinear PAWS, which is well below the ANSI safety limit of 20 mJ·cm$^{-2}$. To avoid potential thermal damage, the laser energy may be attenuated during nonlinear optimization. Since nonlinear PAWS successfully proceeded with fluence as low as about 6 mJ·cm$^{-2}$, the laser energy may be further reduced if safety was a concern in future applications. On the other hand, the high optical fluence after nonlinear PAWS could potentially be leveraged for laser microsurgery at optical resolution in deep tissue, including photocoagulation of small blood vessels and photoablation of tissue. Without invasive probes, laser microsurgery is limited to depths of several hundred micrometers. Nonlinear PAWS could extend the operating depths, while maintaining single speckle grain focusing. This type of microsurgery could potentially lead to new minimally invasive or noninvasive treatment of Parkinson's disease or epilepsy.

The nonlinear PA signal is assumed to be quadratic with the laser pulse energy, based on the linear temperature dependence of the Grueneisen parameter. However, even in the presence of higher-order temperature dependence of the Grueneisen parameter, nonlinear PAWS can still lead to optical diffraction-limited focusing. It should also be noted that the optical focal spot produced using nonlinear PAWS should be near the center of the acoustic focus. However, the precision is limited by the signal-to-noise ratio of the final PA signals and the exact acoustic focal profile.

The expected peak improvement factor for phase-only wavefront-shaping is given by $$\text{Factor} = \pi/4[(N-1)/M]+1, \quad (23)$$

where N is the number of independently controlled SLM blocks and M is the number of optical speckle grains within the acoustic focus. In an aspect, the number of independently controlled SLM blocks may be about 192×108. In another aspect, the number of optical speckle grains within the acoustic focus may be about 169 in the linear PAWS stage. Thus, the theoretical enhancement ratio from the linear PAWS may be about 97. In an aspect, the enhancement may be about 60 (FIG. 7b). In Stage 1, linear PAWS focuses light into the acoustic focal region. In Stage 2, nonlinear PAWS focuses light onto a single-speckle grain. The dashed circles represent the acoustic focal region. A typical intensity distribution (green solid line) is shown above the speckle illustrations. The blue dotted envelopes represent the acoustic sensitivity. The difference could be due to the laser-mode fluctuation, non-uniformity of optical illumination on the SLM, stray light, mechanical instability of the system, and measurement errors. Nonetheless, after linear PAWS, the optical fluence within the acoustic focus was sufficient to generate detectable nonlinear PA signals. After nonlinear PAWS, the number of bright speckle grains would ideally reduce from about 169 to 1. Hence, an improvement factor of about 169 may be expected after nonlinear PAWS. In one aspect, the improvement may be about 100 (FIG. 9c). FIG. 10a and FIG. 10b summarize the visualization of single speckle grain focusing using nonlinear PAWS. The peak fluence enhancement of about 6,000 is also approximately consistent with the expected improvement factor from equation (23) when M after nonlinear PAWS was reduced to about 2-3, counting the "residual" darker speckle grains in FIG. 10b. The 1D profiles across the focus (green solid curves) measure 5.1 and 7.1 μm along x and y, respectively. The dashed circles show the measured transducer focal region (50 MHz, −6 dB). Its lateral profiles (blue dashed curves) measure a FWHM of 65 μm. The intensity values in FIG. 10a and FIG. 10b are normalized to the mean intensity of the image in FIG. 10a.

In speeding up the iterative digital wavefront shaping from current LCoS SLM switching speed of about 60 Hz (although it needs about 1.2 s for a stable image) to ferromagnetic SLM switching speed of about 1 kHz results in an improvement factor of about 16×. Changing to MEMS-DMD switching speed of at least 20 kHz leads to an improvement factor of about 320×.

A nonlinear PAWS approach may be used to break the ultrasonic resolution limit and achieve both optical resolution focusing inside scattering media and a high peak-enhancement factor. While whole blood may be used as the absorbing target in one aspect, the Grueneisen relaxation effect exists broadly in many materials. Therefore, similar performance may be acquired with other types of absorbers. Furthermore, the system may be engineered to respond much faster. Nonlinear PAWS opens an avenue for many micrometer-scale optical applications, including imaging, therapy, and manipulation, inside highly scattering media.

The system setup is schematically illustrated in FIG. 7a, with more details shown in FIG. 11. The system in FIG. 11 may include a blood layer 710; a ground glass diffuser 708; a digital delay generator (DDG) 724; a half-wave plate (HWP) 706; lenses 726, 728, 730, and 732; a neutral density filter (NDF) 734; a neutral density filter wheel (NDFW) 736; a microscopic objective (10×, 0.25 NA) 738; an oscilloscope 718; signal amplifiers 716; a polarizing beam splitter (PBS) 702; a computer 720; a photodiode 740; a spatial light modulator (SLM) 704; a triggering signal 742; and an ultrasonic transducer (UT) 714. The system may further include a laser 744 and a circulator 746. In an aspect, a 532 nm pulsed laser may be used. The laser may produce about 10 ns pulses (pulse energy≤about 0.2 mJ) at an adjustable pulse repetition rate of about 0-30 kHz. The laser beam may be directed through a half-wave plate and a polarizing beam splitter to sample a small fraction of the beam. Light reflected by the beam splitter may be attenuated and measured using a photodiode and may be used to compensate for energy fluctuations of the laser output. Light transmitted by the beam splitter may be expanded, and then reflected off a liquid-crystal-on-silicon based phase-only SLM. The SLM may have an aperture of about 16 mm by about 9 mm, with a resolution of about 1920×1080 pixels. The SLM may be evenly divided into about 192×108 blocks, each independently controlled, with a linearized phase shift between about 0 and about $2\pi$. The reflected beam may be condensed using a set of lenses, and focused by a microscopic objective onto a ground glass diffuser. In an aspect, the objective may be 10×, NA=0.25. A neutral density filter wheel between the SLM and the objective lens may reduce the laser fluence in nonlinear PAWS to avoid thermal saturation. A circular container of bovine blood was placed 10 mm away from the diffuser to serve as the absorptive target for PA sensing. The circular container may be about 15 mm diameter and about 4 mm height. A focused ultrasonic transducer (homemade based on a non-focusing transducer; more details below) may be positioned on the other side of the blood layer to detect the PA signal. Both the blood layer and ultrasonic transducer may be immersed in water for acoustic coupling. The water may be maintained at room temperature by circulation.

The PA signals generated may be amplified by about 50 dB, digitized by an oscilloscope at a bandwidth larger than about 500 MHz, and sent to a computer. The linear and nonlinear PA amplitudes may be quantified in MATLAB, and a genetic algorithm may control the optimization. The phase map may be displayed on the SLM using a graphics card. A digital delay generator may control the synchronization between the laser and the oscilloscope. For linear PAWS, one pulse may be fired about every 20 ms. For nonlinear PAWS, two pulses may be fired with a delay of about 40 μs, but the burst period may remain at about 20 ms. After the optimization, the blood layer may be moved off the optical path, and a CCD camera may be attached to a microscope—with a resolution of about 1 μm/pixel—may be used to image the optical field at the ultrasound focal plane (FIG. 10a and FIG. 10b), when the initial and final phase patterns are displayed on the SLM, respectively.

EXAMPLES

Example 1

The Grueneisen-Relaxation Effect

The Grueneisen-relaxation effect was experimentally validated by imaging red blood cells (RBCs). A monolayer of RBCs was fixed on a glass slide, immersed into deionized water, and positioned in the optical focal plane. Multiple PA images were acquired using two-dimensional raster scanning. At each measurement, the PA amplitude was calculated from the average signal of the entire PA image.

Figure 2:
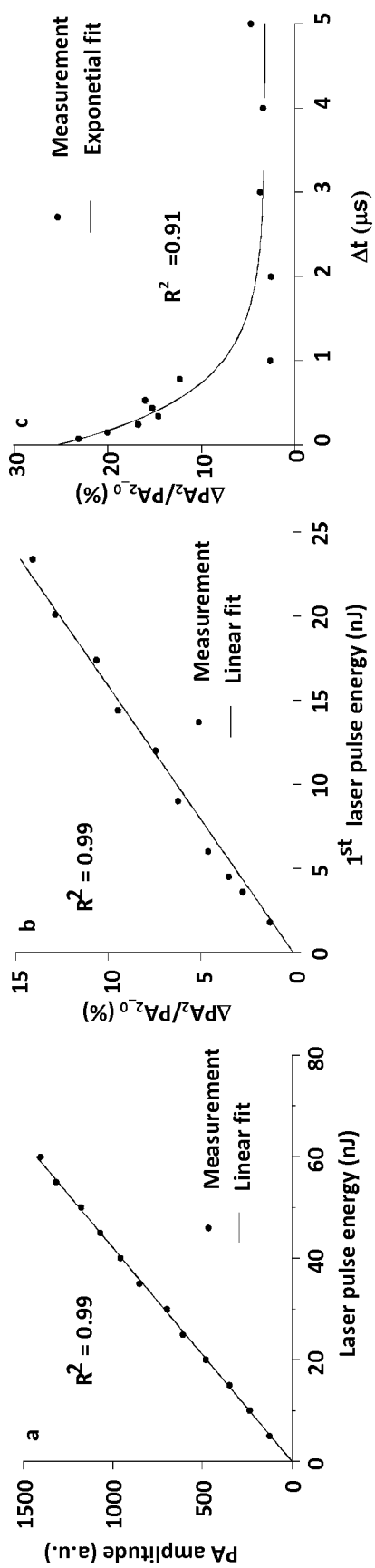
FIG. 2a shows a linear relationship between single-pulsed PA amplitude and pulse energy.
FIG. 2b shows a linear relationship between the increase of the second PA amplitude and the first laser pulse energy.
FIG. 2c shows the increase of the second PA amplitude versus inter-pulse time delay while both laser pulses had constant energy values.

First, the linear relationship was validated between the single-pulse PA amplitude and the excitation laser pulse energy. To avoid the Grueneisen-relaxation effect, only one laser was triggered at 10 kHz. Laser energy was set from 0 to 60 nJ. FIG. 2a shows that the single-pulse PA amplitude was proportional to the laser pulse energy.

Then the Grueneisen-relaxation effect was experimentally demonstrated using two lasers that were sequentially triggered with a 500 ns delay. $\Delta PA_2 = PA_2 - PA_{2\_0}$. $PA_2$ was the second PA amplitude, whereas $PA_{2\_0}$ was the second PA amplitude measured after the first laser was turned off. Both laser pulse energies were chosen within the linear PA range. The first laser pulse energy was tuned from 0 to 25 nJ while the second laser pulse energy was held at 25 nJ. The second laser PA amplitude ($PA_2$) increased from its baseline ($PA_{2\_0}$) while the first laser pulse energy was increased from 0 to 25 nJ. FIG. 2b shows a linear relationship between the percentage increase of the second laser PA amplitude and the first laser pulse energy. The largest increase of the second PA amplitude was 14%. According to the linear relationship between water's Grueneisen parameter and temperature, the highest residual temperature rise was estimated to be 3° C.

The dependence of the Grueneisen-relaxation effect on the time delay between the two pulses was also quantified. Both of the laser pulse energies were set to 25 nJ. The time delay was tuned from 75 ns to 5 μs. As shown in FIG. 2c, the amplitude increase of the second PA signal follows an exponential function of the time delay with a decay constant of 0.63 μs, which validates that the coefficient b in Eq. 11 relates to the time delay between the two pulses. For thermal diffusion in water, the characteristic dimension of the heated region was approximately $\sqrt{4\alpha\tau}=0.57$ μm, where $\alpha$ is water's thermal diffusivity of $1.3\times10^{-3}$ cm²/s, and $\tau$ is the residual temperature decay time of 0.63 μs. This dimension matches the measured OR-PAM lateral resolution of 0.65 μm (see below). Hence, the Grueneisen-relaxation effect was well maintained within the sub-microsecond scale.

Example 2

Measurement of Lateral and Axial Resolutions

Figure 3:
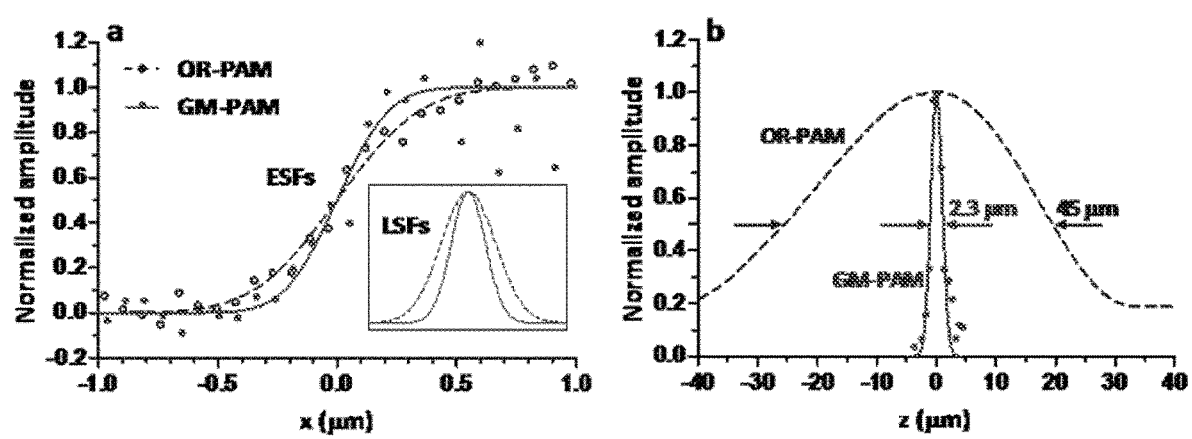
FIG. 3a summarizes the lateral profiles of a sharp edge measured by OR-PAM and GR-PAM. OR-PAM has a lateral resolution of 0.65 μm, while GR-PAM has a lateral resolution of 0.41 μm.
FIG. 3b summarizes the lateral profiles of a sharp edge measured by OR-PAM and GR-PAM.

Lateral resolution was measured by imaging a sharp ink edge on a cover glass. The edge spread function (ESF) of the GR-PAM was obtained by scanning across the sharp edge (FIG. 3a). For comparison, the ESF of the OR-PAM was computed from the PA signal of the first laser pulses. Derivation of the ESFs gives the line spread functions (LSFs, inset in FIG. 3a). The FWHM of the LSF quantifies the lateral resolution. The lateral resolutions of OR-PAM and GR-PAM were 0.65 μm and 0.41 μm, respectively. Therefore, the lateral resolution was improved by a factor of 1.6, close to the theoretical prediction of $\sqrt{2}$. In an aspect, the FWHM of the OR-PAM profile may be 45 μm.

Axial resolution was quantified by scanning perpendicularly to a monolayer of RBCs. At each axial position, the peak-to-peak amplitude of the differential PA signal was recorded to form a 1D depth-resolved image of the GR-PAM, which was fitted to a Gaussian function. The FWHM of the Gaussian curve is 2.3 μm, which is close to the theoretical prediction of 2.4 μm. For comparison, the A-line of the OR-PAM was obtained by converting a time-resolved PA signal into a depth-resolved signal with the known sound speed in water. The envelope of the OR-PAM A-line was calculated using the Hilbert transformation. The FWHM of the envelope is 45 μm. Clearly, GR-PAM provides an optical axial resolution much higher than the acoustic axial resolution.

Example 3

Optical Sectioning Imaging of Red Blood Cells

Figure 4:
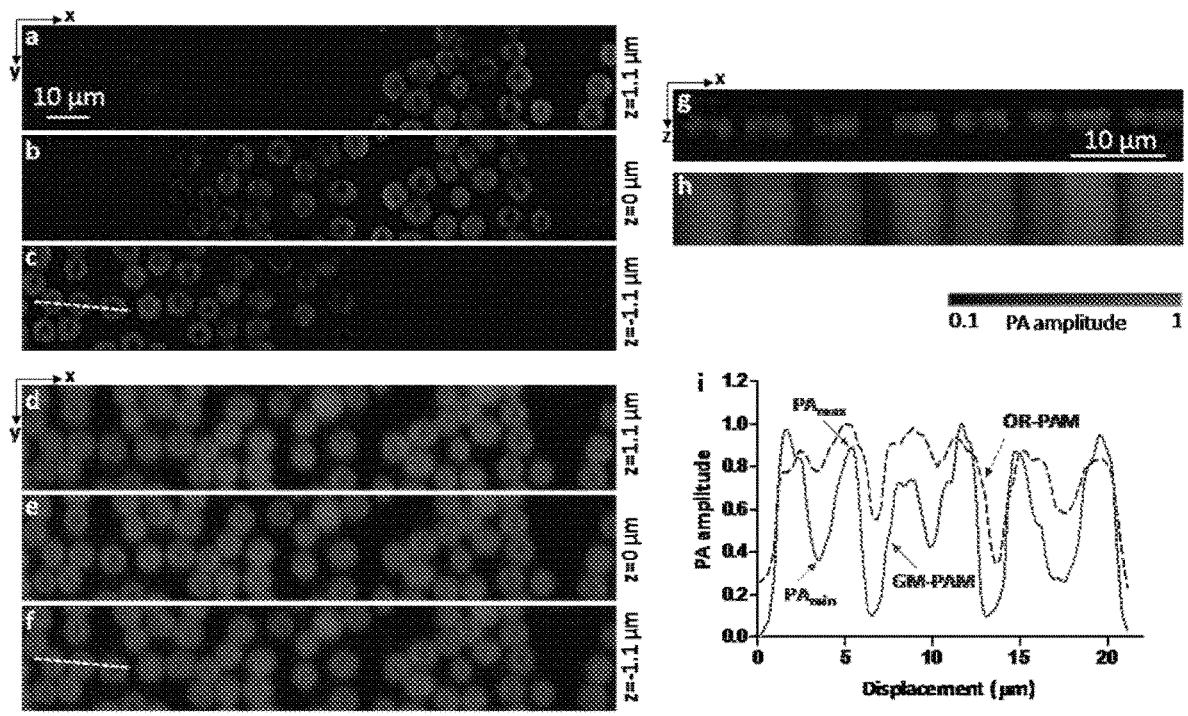
FIG. 4a is a cross-sectional GR-PAM image of red blood cells at a depth of 1.1 μm.
FIG. 4b is a cross-sectional GR-PAM image of red blood cells at a depth of 0 μm.
FIG. 4c is a cross-sectional GR-PAM image of red blood cells at a depth of −1.1 μm.
FIG. 4d is a cross-sectional OR-PAM image of red blood cells at a depth of 1.1 μm.
FIG. 4e is a cross-sectional OR-PAM image of red blood cells at a depth of 0 μm.
FIG. 4f is a cross-sectional OR-PAM image of red blood cells at a depth of −1.1 μm.
FIG. 4g is a side-view GR-PAM image of red blood cells in the x-z plane.
FIG. 4h is a side-view OR-PAM image of the same sample as in FIG. 4g.
FIG. 4i is a summary of the PA profiles along the dashed lines in FIG. 4c and FIG. 4f.

GR-PAM enables optical sectioning, improving the axial resolution. FIG. 4a, FIG. 4b, and FIG. 4c show GR-PAM images of a monolayer of RBCs placed at different axial positions. The average laser pulse energy was set at 25 nJ. As the RBCs moved out of optical focus, the GR-PA signals quickly decreased, demonstrating optical sectioning. FIG. 4d, FIG. 4e, and FIG. 4f present OR-PAM images of the same sample. The OR-PAM signals did not show obvious changes when scanning the sample along the axial direction. FIG. 4g and FIG. 4h present GR-PAM and OR-PAM side-view images in the x-z plane. With optical axial resolution, a small tilt angle of the sample slide was clearly imaged using GR-PAM. In addition to the improvement in the axial resolution, GR-PAM also enhanced image contrast. The doughnut-feature contrast was quantified as $c=(PA_{max}-PA_{min})/PA_{max}$, where $PA_{min}$ is the smallest pixel value in the doughnut feature, and $PA_{max}$ is the nearest peak value around the doughnut center, as shown in FIG. 4i. GR-PAM shows clearer features of the doughnut-shaped red blood cells than OR-PAM. The contrasts of the doughnut-shaped features were measured in GR-PAM and OR-PAM images. Based on measurements from 9 RBCs, the contrast of GR-PAM is 0.46±0.04; and the contrast of OR-PAM is 0.11±0.03 (mean±standard error). The average ratio between the contrasts is 4.2. GR-PAM increased the average contrast by a factor of 4.2.

Example 4

Calibration-Free Measurement of Absolute Absorption Coefficient

The optical absorption coefficient is directly related to the molecular molar extinction coefficient and concentration. By measuring the optical absorption coefficient, the concentration of molecules may be readily determined with a known molar extinction spectrum. One example is to measure the oxy- and deoxy-hemoglobin concentrations in blood, which are important functional parameters associated with tissue oxygenation. PA amplitude is proportional to the optical absorption coefficient and local optical fluence, which makes PA imaging an ideal tool to probe the absorbers' concentration. In order to determine the absolute absorption coefficient from conventional PA signals, the local optical fluence was calibrated. However, the calibration may be challenging in an inhomogeneous medium. For example, other scatterers or absorbers on the optical path might shadow the region of interest, leading to inaccurate fluence calibration. Owing to its optical sectioning capability and absorption contrast, GR-PAM enables a unique approach to the quantification of the absolute absorption coefficient without fluence calibration.

According to Beer's law, the transmitted optical energy decays exponentially with the optical path length. In an absorption-dominant sample, i.e., optical absorption is much stronger than scattering, the optical energy E can be expressed as a function of penetration depth z as follows:

$$E(z)=E_0\exp(-\mu_a z), \quad (13)$$

where $E_0$ is the pulse energy on the absorber surface. According to Eq. 7, the GR-PA signal is proportional to the square of the optical energy. When scanning the GR-PAM focus along the z-axis, the GR-PA signal becomes a function of penetration depth z:

$$\Delta y(z) = kb\eta_{th}^2 E_0^2 \exp[-2\mu_a(x, y, z)z] \quad (14)$$

$$\int\int \mu_a^2(x, y, z)\frac{1}{\pi^2 w^4}\exp\left(-2\frac{x^2+y^2}{w^2}\right)dxdy.$$

If the absorption coefficient is assumed to be uniformly distributed, then Eq. 14 can be re-written as $$\Delta y(z) = kb\eta_{th}^2 \mu_a^2 E_0^2 \frac{1}{2\pi w^2}\exp(-2\mu_a z). \quad (15)$$

Eq. 15 shows that the GR-PA signal is an exponential function of penetration depth. The decay constant is twice the absolute absorption coefficient. Although the laser pulse energy at the absorber surface may change due to shadowing from other objects, the exponential decay constant of the GR-PA signal will not be affected. Therefore, the absorption coefficient can be determined without fluence calibration.

Figure 5:
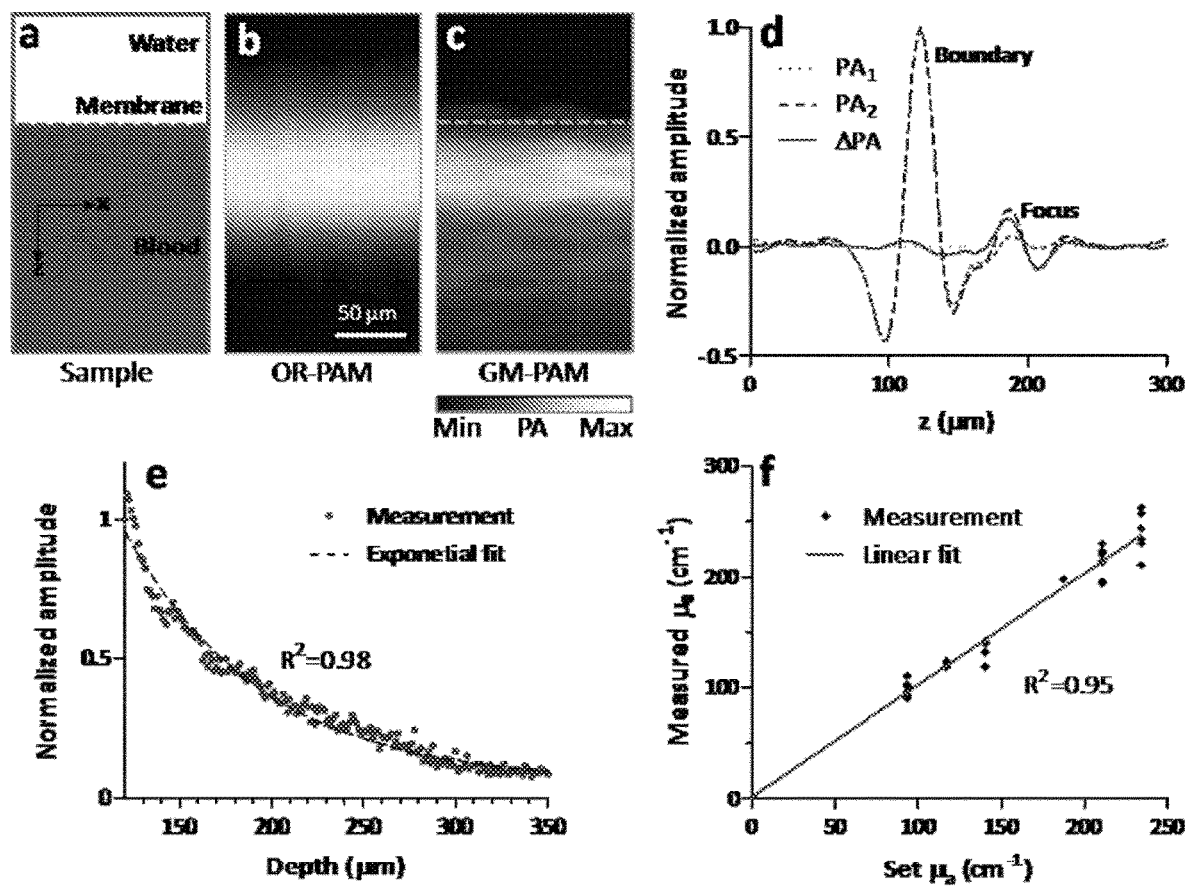
FIG. 5a is a schematic diagram of a semi-infinite blood sample.
FIG. 5b is an OR-PAM cross-sectional image.
FIG. 5c is a GR-PAM cross-sectional image.
FIG. 5d is a graph of time-resolved PA signals from the two laser pulses and the differential PA signal when the focus was 60 μm below the blood surface.
FIG. 5e is a graph that shows exponential decay of GR-PAM amplitude along depth.
FIG. 5f is a graph of measured absolute absorption coefficient versus set absorption coefficient.

GR-PAM was demonstrated to be able to probe the interior of a relatively large absorber. FIG. 5a shows a diagram of a semi-infinite blood sample. The sample was imaged by both OR-PAM and GR-PAM in the x-z plane, with an average laser pulse energy of 15 nJ. The two-dimensional The OR-PAM image in FIG. 5b shows good contrasts only on the upper boundary of the blood sample due to the "boundary buildup", referred to as specular emission here. Although a significant number of photons can penetrate beyond the boundary, the OR-PAM signal shows no obvious contrast beyond the boundary. FIG. 5c is a two-dimensional GR-PAM image, which shows clear signals from deep blood. FIG. 5d shows two depth-resolved PA signals from a pair of laser pulses and their difference. The optical focus was placed 60 μm below the boundary. The two raw PA signals were almost identical at the boundary, but were very different at the focus. Thus in the GR-PA signal, the specular emission was suppressed, but the signal from the optical focal zone was effectively recovered because of the Grueneisen-relaxation effect.

FIG. 5e shows that the GR-PA signal decreases with the penetration depth. The data was fitted to Eq. 15 to recover the absolute absorption coefficient. By diluting the blood sample into different concentrations, different absorption coefficients were measured. The results agree well with the actual absorption coefficients measured with a spectrophotometer. For example, the actual absorption coefficient of 100% blood at 532 nm was measured to be 234 cm$^{-1}$, which validated the GR-PAM measurement of 240±8 cm$^{-1}$.

Example 5

PAWS

The PAWS system setup is illustrated schematically in FIG. 7a. The system may include a polarized beam splitter (PBS) 702, a spatial light modulator (SLM) 704, a half-wave plate (λ/2) 706. The scattering medium consists of a ground glass diffuser 708 and a layer of optically absorbing whole blood 710. The incident light reflected from the SLM surface was scattered by a diffuser 708, generating a random speckle pattern with about 5-μm speckle grains on the blood layer 710. The system further included a lens 712, an ultrasonic transducer 714, an amplifier 716, an oscilloscope 718, and a computer 720 with a genetic algorithm 722. The whole blood 710 and the ultrasound transducer 714 may be within water 748. A photodiode measured laser energy fluctuations to compensate for the PA signals. The pulse energy on the blood layer was about 0.1 mJ, within an illuminated area of about 1 cm$^2$, which corresponded to a fluence of about 0.1 mJ·cm$^{-2}$. Initially, no nonlinear PA signals were observable even at the full energy output of the laser. In order to generate detectable nonlinear PA signals, the optical fluence needs to be sufficiently high (>5 mJ·cm$^{-2}$ for whole blood). Therefore, to increase the optical fluence within the PA sensing region, linear PAWS (Stage 1) was first conducted before nonlinear PAWS (Stage 2). For both stages, the SLM was divided into 192×108 independently controlled blocks, and a genetic algorithm was used to optimize the phase pattern on the SLM.

Figure 8:
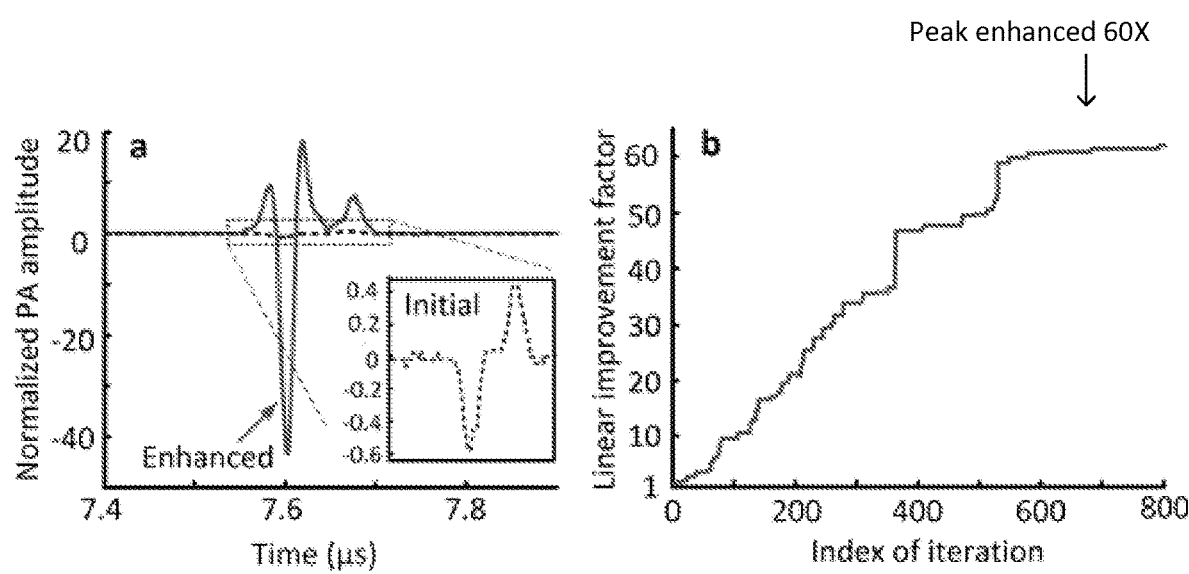
FIG. 8a is PA signals before (dashed curve) and after (solid curve) the linear PAWS (Stage 1) optimization. FIG.

FIG. 8a and FIG. 8b shows experimental results of Stage 1—using linear PA signal as feedback for wavefront shaping (linear PAWS) optimization. In linear PAWS (Stage 1), single laser pulses were fired every 20 ms to generate the PA signals. An initial PA signal (inset of FIG. 8a), averaged over 16 traces, was recorded by displaying a random phase pattern on the SLM. Note that all PA signals were compensated for laser energy changes, and normalized to the initial PA peak-to-peak amplitude shown here. As shown in FIG. 8b, the PA amplitude increased as the linear PAWS optimization proceeded, corresponding to increased optical energy within the acoustic focus. Linear PA amplitude improved ~60 times in Stage 1, indicating a peak enhancement factor of ~60 for optical fluence within the acoustic focus. The algorithm was terminated after 800 iterations, when the PA amplitude increased ~60 times over the initial signal (FIG. 8a). The fluence within the acoustic focus was estimated to increase from about 0.1 to about 6 mJ·cm$^{-2}$. Further enhancement was not seen with linear PAWS, as indicated by the relatively flat response after the 600$^{th}$ iteration.

FIG. 9a, FIG. 9b, and FIG. 9c summarize experimental results of Stage 2—using nonlinear PA signal as feedback for wavefront shaping (nonlinear PAWS) optimization. The final phase map from Stage 1 was used as the starting point for nonlinear PAWS (Stage 2). In the nonlinear PAWS experiment, a pair of pulses were fired, separated by 40 μs (limited by the maximum laser repetition rate), well within the thermal confinement time of 189 μs (estimated based on a speckle size of about 5 μm and a thermal diffusivity of about $1.3 \times 10^{-3}$ cm$^2$·s$^{-1}$). The initial PA signals, obtained by using the phase map from Stage 1, are shown in FIG. 9a. The difference between the two PA signal amplitudes $\Delta V$ was used as feedback in nonlinear PAWS. The final PA signals after 1600 iterations are shown in FIG. 9b, which also shows the optimized phase pattern displayed on the SLM as an inset. Note that the shown signals have been compensated for the laser pulse energy adjustments shown in FIG. 9c. The first PA signal remained relatively constant before and after nonlinear PAWS, but the second PA signal was dramatically enhanced because of the Grueneisen relaxation effect. The inset shows the final optimized phase pattern displayed on the SLM. The increase of the nonlinear PA amplitude with iteration in Stage 2 is shown in FIG. 9c. As seen, the final nonlinear PA amplitude was ~100 times greater than the initial value, indicating a ~100-time improvement of the peak fluence. To avoid overheating the blood during the optimization, the laser energy was attenuated by 10% every 300 iterations. This attenuation caused the measured $\Delta V$ to change between each of the six adjustments in the experiment. The algorithm therefore re-measured $\Delta V$ at the start of each stage. All other parameters were kept constant between consecutive stages. The change in energy was compensated for in the results shown in FIGS. 9b and 9c. The nonlinear signal increased in every stage but the last, indicating that by the end of the nonlinear optimization, the focal spot had approached its smallest size. Nonlinear PA amplitude improved ~100 times during Stage 2. 1600 iterations were used, with the incident laser energy (E) attenuated by 10% every 300 iterations to avoid overheating the sample. The normalized laser energy $R = E/E_{max}$ is also shown, where $E_{max}$ was the initial laser energy used before adjustment. The compensated nonlinear PA amplitudes are given by $\Delta V/R^2$, and the nonlinear improvement factor is therefore given by $$\frac{\Delta V/R^2}{\Delta V_{initial}}.$$

The optical field was imaged at the ultrasound focal plane using a CCD. When a random phase pattern was displayed on the SLM, a speckle pattern (FIG. 9a) was captured with randomly distributed speckle grains. The FWHM of the acoustic focus is shown by the dashed circle. Note that there are many speckle grains within the acoustic focus. When the optimized phase pattern from nonlinear PAWS was displayed, a focal spot with the size of a single speckle grain was formed (FIG. 9b). The size of the focal spot was measured to be 5.1 μm×7.1 μm (FWHM), which is ~10 times smaller than that of the acoustic focus.

Example 6

Transducer Field Calibration

A 50-MHz focused ultrasonic transducer was used in the experiment. The transducer was modified in-house from a non-focusing transducer (V358, Panametrics NDT, USA) by adding an acoustic focusing lens. Due to the high center frequency, the typical method of characterizing the transducer using a hydrophone or a pulser-receiver cannot be used. Instead, acoustic phase conjugation was used from a metal ball (8 mm diameter) to measure the acoustic focal zone. The transducer axial focus was measured to be 11.425 mm from the transducer, and the lateral FWHM of the focal region was 65 μm. FIG. 12a and FIG. 12b summarize the focus calibration of the 50 MHz transducer. In FIG. 12a, a function generator 750 (FG; DG4162, Rigol) generates a burst including 10 cycles of 50 MHz sine waves, with a peak-to-peak amplitude of 5 V. The burst is sent to the ultrasonic transducer (UT) 714, which emits an acoustic burst correspondingly. The acoustic wave is reflected by the metal ball, and received by the transducer. The echoed signal is digitized using an oscilloscope 718 (Osc; TDS 5034, Tektronix). The peak-to-peak value is proportional to the acoustic pressure amplitude at each position. In experiment, the transducer is moved along the z direction first to determine the axial focal plane, and then scanned along the y direction to characterize the lateral profile at the focal plane. In FIG. 12b, the squares are measured data, and the curve is a Gaussian fit. The acoustic focal profiles shown in FIG. 10b are based on the interpolation of the measured data.

Example 7

Speckle Size

By calculating the autocorrelation of the speckle pattern imaged before wavefront-shaping optimization, the speckle grain size was measured at the ultrasound focal plane to be about 5 μm. This measurement was consistent with both the final experimental optical focus size, and the estimated value using the equation λ×L/D, where λ=0.532 μm is the optical wavelength, L=10 mm is the distance from the diffuser to the absorber, and D≈1 mm is the size of the beam illuminating the diffuser.

What is claimed is:

1. A method of focusing a light pulse within a focus area using nonlinear photoacoustic wavefront shaping, the method comprising:
obtaining an initial Grueneisen-memory photoacoustic microscopy (GM-PAM) feedback signal using an initial wavefront from within the focus area;
obtaining at least one subsequent GM-PAM feedback signal, each subsequent GM-PAM feedback signal obtained using a subsequent wavefront determined by altering a preceding wavefront according to a wavefront optimization rule using an immediately preceding GM-PAM feedback signal obtained using the preceding wavefront;
selecting an optimized wavefront according to an optimization criterion;
focusing the light pulse comprising the optimized wavefront within the focus area at a single-speckle resolution,
wherein a GM-PAM signal is obtained by:
delivering a first laser pulse comprising one wavefront to the focus area;
detecting a first photoacoustic signal induced by illumination of the focus area by the first laser pulse;
delivering a second laser pulse comprising the one wavefront to the focus area at a lag interval time after the delivery of the first laser pulse;
detecting a second photoacoustic signal induced by illumination of the focus area by the second laser pulse; and
subtracting a first peak-to-peak amplitude of the first photoacoustic signal from a second peak-to-peak amplitude of the second photoacoustic signal to obtain the GM-PAM signal; and
wherein each subsequent wavefront produces a subsequent GM-PAM signal higher than any preceding GM-PAM signal.

2. The method of claim 1, wherein the wavefront optimization rule comprises a genetic algorithm.

3. The method of claim 1, wherein the optimization criterion is chosen from:
the optimized wavefront is the wavefront determined after a maximum number of GM-PAM signals have been obtained;
the optimized wavefront is the wavefront for which a difference in a GM-PAM signal associated with the optimized wavefront and the immediately preceding GM-PAM signal is less than a minimum GM-PAM signal difference; and
the optimized wavefront produces a GM-PAM signal greater than a minimum threshold GM-PAM signal.

4. The method of claim 3, wherein the maximum number of GM-PAM signals ranges from about 100 to about 2000.

5. The method of claim 1, wherein the lag interval time is less than about 50 µs.

6. The method of claim 1, wherein each wavefront comprises a spatial phase pattern generated by delivering a laser pulse through a configurable spatial light modulator.

7. The method of claim 6, wherein the initial wavefront is chosen from a random spatial phase pattern and an optimal spatial phase pattern obtained by a linear photoacoustic wavefront shaping method.

8. The method of claim 1, wherein the focus area of the GM-PAM signal comprises a lateral resolution of less than about 10 µm.

9. The method of claim 1, further comprising centering the focus area within an acoustic focus region by:
obtaining a plurality of scanned photoacoustic signals using the optimized wavefront scanned across the acoustic focus region at a plurality of scan locations, wherein the optimized wavefront is scanned across the acoustic focus region by applying a linear phase ramp to an optimized spatial phase pattern associated with the optimized wavefront; and
using the scan location associated with the highest photoacoustic signal of the plurality of scanned photoacoustic signals to center the focus area within the acoustic focus region.

10. The method of claim 1, wherein a high-fluence laser pulse comprising the optimized wavefront is delivered to the focus area to perform a laser microsurgery, the laser microsurgery comprising a photocoagulation of small blood vessels, a photoablation of tissue, and any combination thereof.

11. A method of Grueneisen-memory photoacoustic microscopy (GM-PAM) of a subject, the method comprising:
delivering a first laser pulse to a focus region;
detecting a first photoacoustic signal induced by illumination of the focus region by the first laser pulse;
after a lag interval time after the delivery of the first laser pulse, delivering a second laser pulse to the focus region, wherein the lag interval time is less than a thermal relaxation time of the subject;
detecting a second photoacoustic signal induced by illumination of the focus region by the second laser pulse; and
subtracting a first peak-to-peak magnitude of the first photoacoustic signal from a second peak-to-peak magnitude of the second photoacoustic signal to obtain a GM-PAM signal corresponding to the focus region,
wherein the first laser pulse and the second laser pulse each comprise a pulse width of less than or equal to about 10 ns.

12. The method of claim 11, wherein the lag interval time is less than or equal to about 20 µs.

13. The method of claim 11, wherein a lateral resolution of the GM-PAM is less than about 0.5 µm.

14. The method of claim 11, wherein the GM-PAM comprises performing optical sectioning at an axial resolution of less than about 5 µm.

15. A method of focusing a light pulse within a focus area using nonlinear photoacoustic wavefront shaping, the method comprising:
obtaining an initial Grueneisen-memory photoacoustic microscopy (GM-PAM) feedback signal using an initial wavefront from within the focus area;
obtaining at least one subsequent GM-PAM feedback signal, each subsequent GM-PAM feedback signal obtained using a subsequent wavefront determined by altering a preceding wavefront according to a wavefront optimization rule using an immediately preceding GM-PAM feedback signal obtained using the preceding wavefront;
selecting an optimized wavefront according to an optimization criterion; and
focusing the light pulse comprising the optimized wavefront within the focus area at a single-speckle resolution,
wherein each wavefront comprises a spatial phase pattern generated by delivering a laser pulse through a configurable spatial light modulator, and
wherein the initial wavefront is chosen from a random spatial phase pattern and an optimal spatial phase pattern obtained by a linear photoacoustic wavefront shaping method.

* * * * *